(12) United States Patent
Damodaran et al.

(10) Patent No.: US 11,573,874 B2
(45) Date of Patent: Feb. 7, 2023

(54) SYSTEMS AND METHODS FOR AUTOMATED INJECTION OF EFFECTS IN CYBER-PHYSICAL SYSTEMS AND THEIR SIMULATIONS

(71) Applicant: The MITRE Corporation, McLean, VA (US)

(72) Inventors: Suresh K. Damodaran, Acton, MA (US); Caleb Stepanian, McLean, VA (US); Paul D. Rowe, McLean, VA (US)

(73) Assignee: The MITRE Corporation, McLean, VA (US)

( * ) Notice: Subject to any disclaimer, the term of this patent is extended or adjusted under 35 U.S.C. 154(b) by 108 days.

(21) Appl. No.: 17/141,671

(22) Filed: Jan. 5, 2021

(65) Prior Publication Data
US 2022/0214952 A1 Jul. 7, 2022

(51) Int. Cl.
*G06F 11/00* (2006.01)
*G06F 11/30* (2006.01)
(Continued)

(52) U.S. Cl.
CPC ...... *G06F 11/3006* (2013.01); *G06F 11/1407* (2013.01); *G06F 11/3072* (2013.01);
(Continued)

(58) Field of Classification Search
CPC ............. G06F 11/3692; G06F 11/3688; G06F 11/3664; G06F 11/3612; G06F 11/3409; G06F 11/3006; G06F 11/263
See application file for complete search history.

(56) References Cited

U.S. PATENT DOCUMENTS 8,954,806 B2 * 2/2015 Dan ..................... G11C 29/10
714/41
9,432,430 B1 8/2016 Klenz
(Continued)

FOREIGN PATENT DOCUMENTS

WO 2016/127210 A1 8/2016

OTHER PUBLICATIONS

Cheng et al. (Mar. 2019) "Checking is Believing: Event-Aware Program Anomaly Detection in Cyber-Physical Systems", IEEE Trans. Dependable Secur. Comput; 16 pages.
(Continued)

*Primary Examiner* — Charles Ehne
(74) *Attorney, Agent, or Firm* — Morrison & Foerster LLP

(57) ABSTRACT

Systems and methods for automatically injecting effects in cyber-physical systems and their simulations are provided herein. In one example, the cyber-physical system under test can include one or more watch-point monitors that can analyze messages between components of the system to determine the presence of one or more particular patterns present in the messages being passed between components of the system during operation. In one or more examples, upon detection of one or more conditions matching a watch point, the systems and methods presented herein can activate an effect and inject it into the cyber-physical system under test based on the detected watch point. In one or more examples, the systems and methods can provide a domain-specific "effects language" (EL) that can allow a user to specify a watch point and an effect corresponding to the watch point.

39 Claims, 23 Drawing Sheets

(51) Int. Cl.
*G06K 9/00* (2022.01)
*G06F 11/34* (2006.01)
*G06F 16/903* (2019.01)
*G06F 11/14* (2006.01)

(52) U.S. Cl.
CPC .... *G06F 11/3466* (2013.01); *G06F 16/90344* (2019.01); *G06K 9/00543* (2013.01)

(56) References Cited

U.S. PATENT DOCUMENTS

| | | | |
|---|---|---|---|
| 9,705,751 | B1 | 7/2017 | Yi et al. |
| 10,296,748 | B2 | 5/2019 | Telang et al. |
| 11,301,350 | B1* | 4/2022 | Byrne ................... G06F 11/327 |
| 2019/0219994 | A1 | 7/2019 | Yan et al. |
| 2020/0285571 | A1* | 9/2020 | Mohan ................ G06F 11/3612 |
| 2022/0091186 | A1* | 3/2022 | Durga ....................... G06F 1/10 |

OTHER PUBLICATIONS

Ye et al. (Apr. 2005) "Statistical En-Route Filtering of InjectedFalse Data in Sensor Networks," IEEE Journal on Selected Areas in Communications, vol. 23, No. 4, 839; 12 pages.

\* cited by examiner

SYSTEMS AND METHODS FOR AUTOMATED INJECTION OF EFFECTS IN CYBER-PHYSICAL SYSTEMS AND THEIR SIMULATIONS

FIELD OF THE DISCLOSURE

This disclosure relates to systems and methods for injecting effects in cyber-physical systems and their simulations that can triggered by the detection of one or more patterns in the streaming messages generated during operation of a distributed software program.

BACKGROUND OF THE DISCLOSURE

In the field of computer science, distributed systems have been utilized to allow for faster and more efficient execution of program code that can often prove overly cumbersome and computationally complex for a single stand-alone system to effectively process. A distributed system can refer to a computing mode in which multiple networked computers "work together" by communicating and coordinating their actions to achieve a single result. Distributed systems can be bus based or each individual computing node can be networked to the other computing nodes in the distributed system. In a bus-based system, the components send messages to each other through the bus, by broadcasting the messages to the bus such that every node of the system attached to the bus receives the message. In the context of computing, distributed systems consisting of multiple computers can work together to execute a single program, thereby spreading the computational burdens across the multiple computers so as to not overly burden any single computer.

The multiple computing resources organized in a distributed system can communicate and coordinate their actions by passing along messages to one another. In an example where multiple computers work together to execute a single program, each computer can perform one or more tasks associated with execution of the program, and they can pass messages to another computer in the distributed system, wherein the message can contain information required by the receiver to execute their task within the program.

Distributed systems, such as those described above can be vulnerable to attacks from malicious users seeking to interfere with those systems so as to cause unintended effects to the system that can frustrate or even completely interfere with the operation of those systems. For instance, distributed software systems are often used to operate cyber-physical systems in which physical processes are controlled or monitored by computer based algorithms. By interfering with the normal operation of the distributed software used to implement the cyber-physical system, a malicious user can often gain unauthorized access to physical devices and can operate those devices contrary to their intended purpose.

In order to develop a robust and secure cyber-physical system, it is important to first understand the many ways in which malicious access to the distributed software system can affect the physical components within the system. Often times it is not clear how manipulation of the messages passed between components in a distributed software system can lead to physical effects on the cyber-physical system. Thus, the ability to simulate attacks on the distributed software system to understand how the physical aspects of the system are affected, can lead to the design of more robust and secure cyber-physical systems.

However, simply testing a cyber-physical system by injecting simulated effects into the system may not produce accurate results. For instance, certain effects may only be injected under certain scenarios. For instance, various effects (i.e., attacks) may only be executed when certain messages or patterns of messages occur during the operation of the distributed software system implemented in the cyber-physical system. Thus, when simulating various effects on a cyber-physical system, it can be important to make sure that the effect is injected at the correct time (i.e., when a particular operating condition in the system software has occurred). Injecting the effect at the correct time can ensure that the consequences of the effect can be properly analyzed.

Thus, in order to accurately simulate various effects on a cyber-physical system, it can be important to have the ability to determine when a particular condition or state is occurring in the operation of the distributed software system, and then inject the appropriate effect to be tested once the condition has been detected. It can also be important to do so in a manner that minimizes the latency experienced by the cyber-physical system.

SUMMARY OF THE DISCLOSURE

Accordingly, systems and methods for automatically injecting effects in cyber-physical systems and their simulations are provided. In one example, the cyber-physical system under test can include one or more watch-point monitors that can analyze messages between components of the system to determine the presence of one or more particular patterns present in the messages being passed between components of the system during operation. Upon detecting the pattern, in one or more examples, the systems and methods presented herein can inject one or more effects (i.e., by manipulating the messages being passed between components of the system) so as to simulate an attack on the system under test.

In one or more examples, the system and methods can provide a domain-specific Happened-Before-Language (HBL) to detect order dependent or independent properties among message logs through the specification of happened-before (HB) relationships among the messages, components, and their variable values of components of the system. The language can permit the specification of message types, components, and logical expressions involving message variables and component variables. Watch points may be defined using HBL to detect specific conditions of the variables' values and message type occurrence. Detection of the watch points may be done in real time by performing analysis on a real-time stream of data being transmitted between two nodes in the distributed software system.

In one or more examples, each data stream in a distributed software system can include a detection engine that can buffer the stream for analysis. In one or more examples, and to facilitate detection, the messages buffered by the detection engine can be converted to a log string in an intermediate standardized format over which watch points are specified using HBL. Regular expressions can be derived from the HBL-based watch point specifications and then applied to the log string. In one or more examples of the disclosure, the term regex can refer to regular expressions or any logical expression. This approach can allow for the detection of watch points in real time or on messages collected in a log file. HBL can be especially useful for detecting order dependent properties in cyber-physical systems.

In one or more examples, upon detection of one or more conditions matching a watch point, the systems and methods presented herein can activate an effect and inject it into the cyber-physical system under test based on the detected watch point. In one or more examples, the systems and methods can provide a domain-specific "effects language" (EL) that can allow a user to specify a watch point and an effect corresponding to the watch point. During operation of the cyber-physical system, when the occurrence of a watch point condition is detected, the system can then act to inject the corresponding effect specified by the user using EL. In one or more examples, the effect can then be later deactivated as specified by the user using EL. In one or more examples, the activation and deactivation of an effect can be triggered by one or more watch points.

In one or more examples, an effect can include changes in the content of an event stream, or a function call or an invocation of Application Program Interface (API) of a system component or an external system, resulting in a change in the system component or external system.

DETAILED DESCRIPTION OF THE DISCLOSURE

Figure 1:
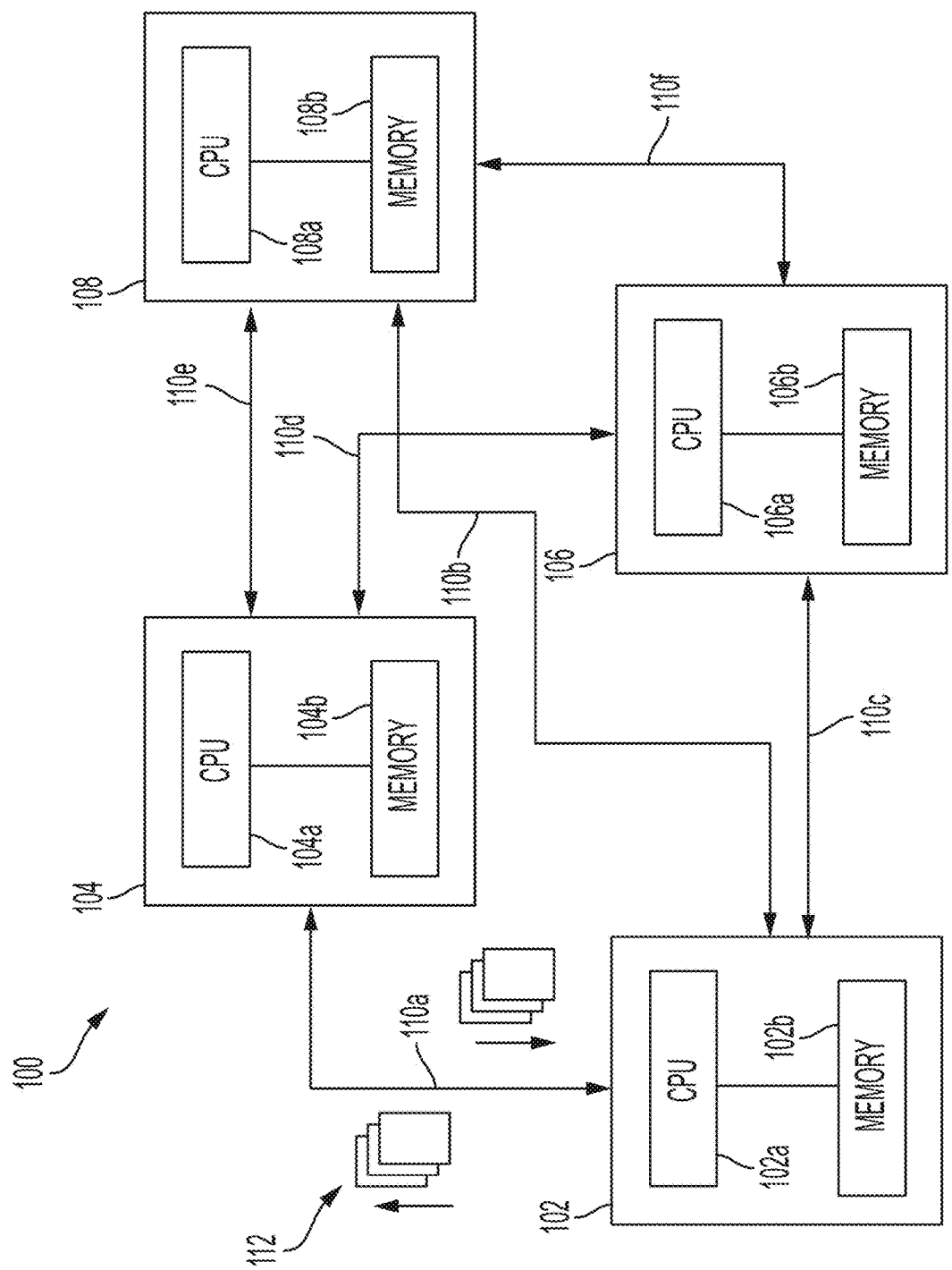
FIG. 1 illustrates an exemplary distributed computing system configured to execute a distributed software program according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present Disclosure include process steps and instructions described herein in the form of an algorithm. It should be noted that the process steps and instructions of the present Disclosure could be embodied in software, firmware, or hardware, and, when embodied in software, they could be downloaded to reside on and be operated from different platforms used by a variety of operating systems.

The present Disclosure also relates to a device for performing the operations herein. This device may be specially constructed for the required purposes or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present Disclosure is not described with reference to any particular programming language. It will be appreciated that a variety of programming languages may be used to implement the teachings of the present Disclosure as described herein.

Described herein are systems and methods for injecting effects into a distributed software system such as a cyber-physical system. In one or more examples, and as described in further detail below, a user can specify an effect to be injected into a distributed software system. In one or more examples, specifying an effect to be injected can include specifying both a condition in the distributed software system to detect, and can also include specifying an effect to inject once the specified condition has been determined to have occurred. In one or more examples, the user can utilize a domain-specific language that is specifically configured to allow the user to specify both the condition and effect. Once the user specifies the effect in the domain-specific language, the system can use the specification to determine when the specified condition occurs, and then injects the specified effect in response to the detection of the specified condition.

FIG. 1 illustrates an exemplary distributed computing system configured to execute a distributed software program according to examples of the disclosure. The example of FIG. 1 illustrates a distributed computing system 100 that includes a plurality of computing elements 102, 104, 106, and 108. Each computing element 102, 104, 106, and 108 can include both a processor 102a, 104a, 106a, and 108a and a memory 102b, 104b, 106b, and 108b respectively. The processor and memory of each computing element can be utilized to execute a distributed software program in which portions of the overall program are executed individually by each computing element. The computing elements can coordinate their various actions by passing messages to one another that indicate the status of variables or other information needed by a component to carry out its portion of the distributed program. These messages can be referred to as "log streams" or "log files." The present disclosure thus may use the term log stream and log file interchangeably. In one or more examples, each component of the system 100 (i.e., 102, 104, 106, 108) can generate log streams 112 which can then be stored in a memory (not pictured) thus creating a log file that stores the contents of the log stream.

In one or more examples, each computing element 102, 104, 106, and 108 can be communicatively coupled to one another via communication channels 110a-f. In one or more examples, communications through communications channel 110a-f can be implemented using Wi-Fi, Bluetooth, Ethernet, or any other type of communications channel known in the art to connect two or more computing devices. In one or more examples, each computing element can be connected to every other computing element that is part of the distributed system. Alternatively, each computing element may be connected to only a subset of the computing elements that form the distributed computing system.

Figure 2:
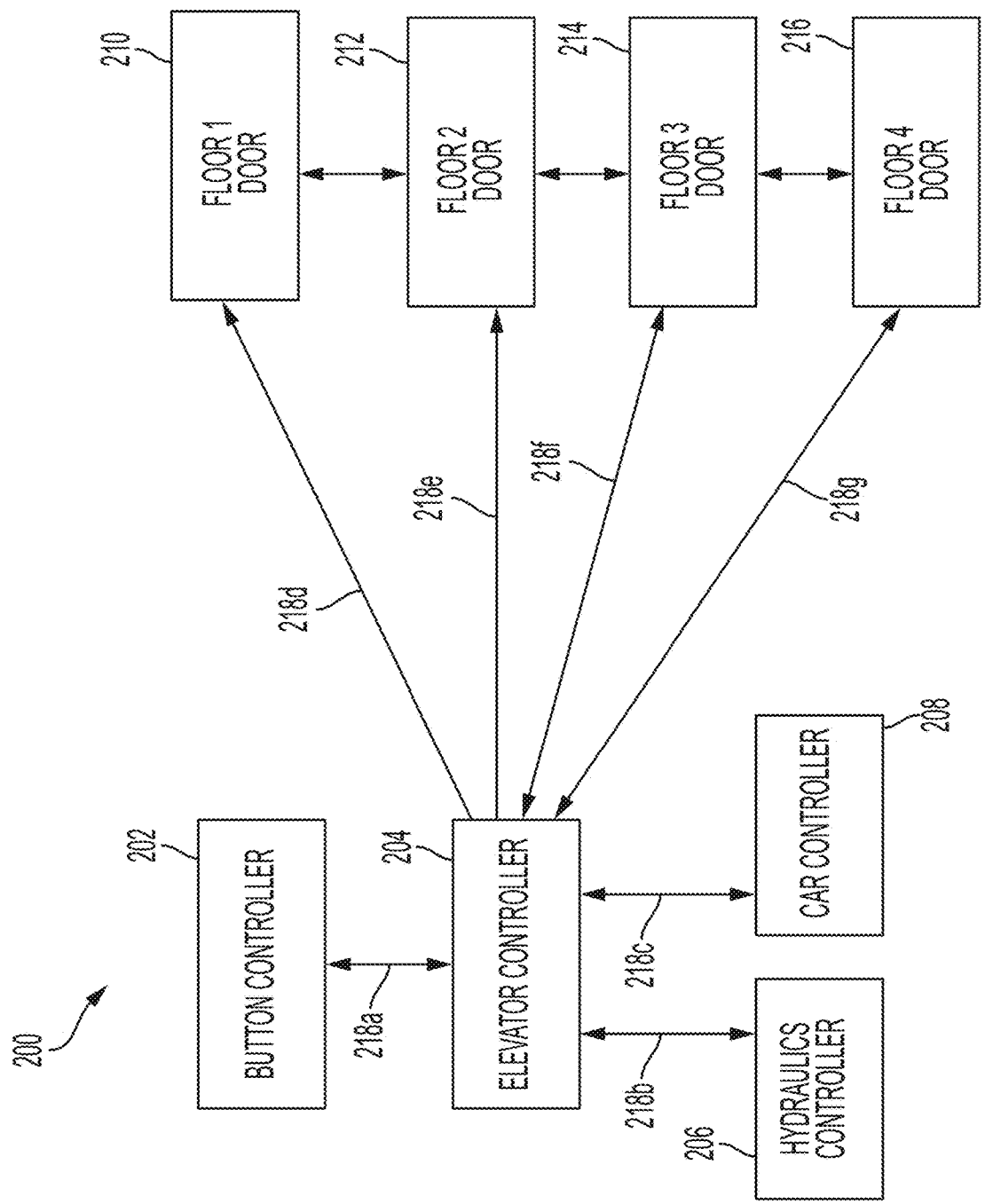
FIG. 2 illustrates an exemplary cyber-physical system that can utilize a distributed computing architecture according to examples of the disclosure.

Distributed computing systems can be utilized to coordinate the activities of multiple computing elements to execute a common task. For instance, a cyber-physical system can be implemented using a distributed computing environment. Cyber-physical systems can refer to systems that include physical entities and mechanisms that are controlled and monitored by computer-based processes. FIG. 2 illustrates an exemplary cyber-physical system that can utilize a distributed computing architecture according to examples of the disclosure. The system 200 described with respect to FIG. 2 can be implemented in an elevator system that transports people and/or objects from one floor of a building to another floor of a building. The system 200 can include a plurality of components 202, 204, 206, 208, 210, 212, and 214 that can be used by the elevator system to facilitate the transport of individuals from one floor of a building to another.

Button controller 202 can represent the processor and memory associated with the buttons of the elevator that are manipulated by a user of the elevator to control which floor/floors the elevator goes to. Elevator controller 204 can represent the processor and memory that can act as the central computing element of the system 200 that can coordinate the activities of each of the other elements attached to it. For instance, elevator controller 204 can be communicatively coupled to hydraulics controller 206 that coordinates the hydraulic components of the elevator system, the car controller 208 that controls the elevator car, and door processors 210, 212, 214, and 216, which control the individual doors of each floor of the building (in this example, the building has four floors).

Similar to the system described with respect to FIG. 1, the individual components of the system 200 can coordinate their activities with respect to executing a distributed software program by passing messages to one another via communications channels 218a-g. The distributed software program being executed by the system 200 can be configured to allow each of the individual components of the system to work together to execute on the common goal of facilitation the operation of the elevator for ordinary use.

The system 200 can act as an example of a cyber-physical system that utilizes a distributed computing architecture. When a software developer is developing distributed software such as the one used to operate the system 200, any errors in the code used to execute the system may be difficult to diagnose and remedy because the code used to implement the system may reside on multiple components of the system. In the example of the system 200, if the elevator is not operating correctly due to a bug in the software used to run the system, a developer may encounter difficulty in locating where the bug is in the code because portions of the code reside on different devices.

In light of this difficulty, software developers have often turned to replay debuggers to aid in the process of diagnosing and fixing errors in the software that are encountered during the development process. As the name implies, replay debugging can involve the execution of a software program that is "recorded" and then played back in a controlled manner to allow a software developer to step through the execution of a software program to pinpoint errors in execution. In the context of a distributed computing system that can execute a distributed software program, a replay debugger can utilize the messages that are generated by components of the distributed system and passed between them to aid the developer in diagnosing errors in distributed software. A replay debugger can operate by collecting all of the messages generated during the operation of a distributed software program and presenting them to the developer so that the developer can sort through them to determine the root cause of an error.

However, the process of sorting through messages generated during the execution of a distributed software program can be cumbersome since many systems that employ a distributed computing environment can produce copious amounts of messages that are often not presented to the user in an organized manner that is meaningful to the developer. The process of sifting through the messages passed between components in a distributed system can be cumbersome and inefficient. Oftentimes, the user of a replay debugger does not want to inspect each and every message associated with the execution of the distributed software but would rather see a subset of those messages, wherein the subset is defined by the user's own constraints.

Figure 3:
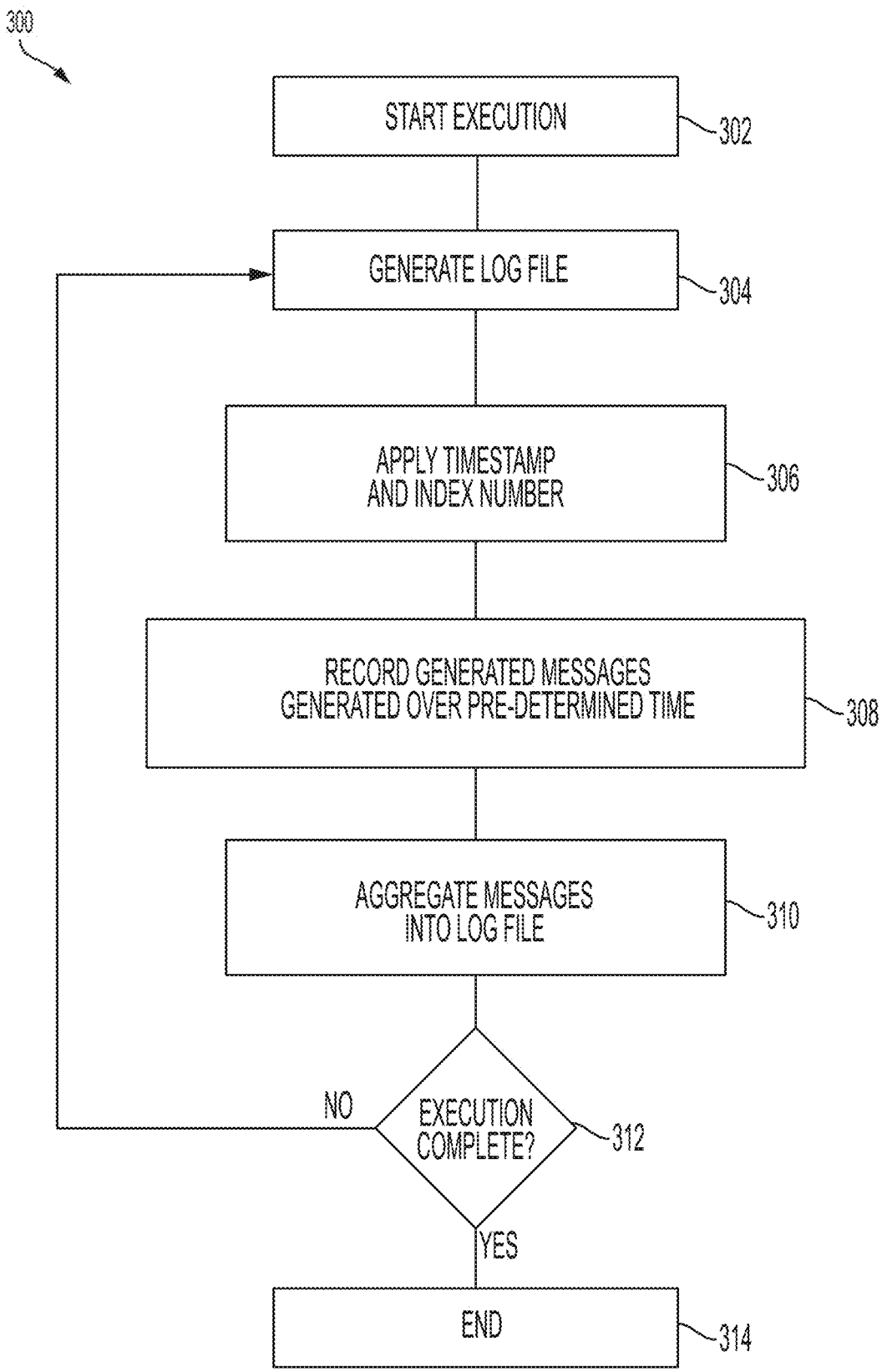
FIG. 3 illustrates an exemplary process for collecting and aggregating messages associated with the execution of a distributed software program according to examples of the disclosure.

FIG. 3 illustrates an exemplary process for collecting and aggregating messages associated with the execution of a distributed software program according to examples of the disclosure.

In order to configure a graphical user interface to operate with the above-described features, the data generated from the messages during execution of the distributed software program can be collected and organized to facilitate the user of the replay debugger's interacting with the graphical user interface.

FIG. 3 illustrates an exemplary process for collecting and aggregating messages associated with the execution of a distributed software program according to examples of the disclosure. The process 300 can be configured to organize the messages generated during execution of a distributed software program into a plurality of logs that are organized in a manner that facilitates operation of a graphical user interface that can make the replay debugging process more efficient.

The process 300 can begin at step 302, wherein execution of a distributed software program is started. As discussed above, a distributed software program can be executed over multiple computing elements. In one or more examples, at step 302, a portion of the distributed software program can be executed according to a user's specification. Using the example of the elevator provided above, the distributed software program associated with operation of the elevator system and its components can be operated beginning with a specific operation such as a user calling the elevator. In other words, step 302 can represent the beginning of a simulation that tests the operation of the distributed software program used to run the elevator.

Once the execution of the software or simulation is started at step 302, the process 300 can move to step 304, wherein a log file is initially created. In one or more examples of the disclosure, a "log file" can include a file that is stored in all types of memory includes non-volatile memory (i.e., disk) or volatile memory (i.e., cache). As will be described further below, a log file can be ingested by the graphical user interface of the replay debugger and used to provide information to the user of the replay debugger about the messages generated during the operation of the software.

Once the initial log file is created at step 304, the process 300 can move to step 306, wherein a timestamp and an index number can be written into the log file. Since the execution of a distributed software program can be spread over multiple separate computing elements, there generally is not a master clock or common clock between the components that can be utilized as a frame of reference to understand the time relationships between various messages passed between components of the distributed computing system. Thus, at step 306, once a log file has been generated, the generated log file can have a timestamp written into the file. In one example, time zero can be established to be at step 302, wherein execution of the distributed software program under inspection is begun, and can stamp the log file generated at step 304 with the time that has elapsed since the execution of step 302. For example, if 20 seconds has passed since step 302 was executed and the log file was created at step 304, then the process 300 can write simulation time=20 seconds within the generated log file.

In addition to writing a time stamp at 306, the process can also write an index number to the generated log file. The rate at which messages are generated during the execution of a distributed software program may exceed the resolution of the simulation time clock. For instance, if the simulation time is kept at a resolution of one second, but multiple log files are generated during that one second (i.e., for instance, if log files are generated every millisecond), then the index number can be used by the replay debugger to keep track of the chronological order of the log files within a given time frame. For instance, if 74 different log files are generated during the 20th second of the software execution, then each of the log files can be written with an index number one through seventy four indicating the order in which the logs were generated during the 20th second. In one more examples, the generated log file can have a timestamp written to it as described above, have an index number written to it as described above, or both.

Once the timestamp and/or index number has been written to the generated log file at step 306, the process 300 can move to step 308, wherein messages generated over a pre-determined time are recorded. As described above, during operation of a distributed software program, a plurality of message can be generated by each of the components of the distributed computing system and transmitted to other components with the distributed computing system. At step 308, the messages generated during the execution of the distributed computing system can be recorded, i.e., stored in a memory. The messages can be recorded over a pre-determined amount of time as set by a user or by the default specifications of the code used to operate the replay debugger. In one or more examples, the user of the replay debugger can manually constrain which messages they wish to be recorded. For instance, in a multi-component distributed computing system, the user of the replay debugger may desire to only review the messages associated with a subset of the components in the distributed computing system. Thus, in one or more examples, the user of the replay can be provided with a graphical user interface that can allow for them to manually select which components of the distributed system should have their messages recorded during step 308.

Once the messages have been recorded at step 308, the process 300 can move to step 310, wherein the messages are aggregated and written into the log file. Aggregation can refer to the process of organizing the generated messages into a single log file or, in some examples, can also refer to the process of combining multiple log files into a single file that can be ingested by the replay debugger.

Once the recorded messages have been aggregated and written into the generated log file at step 310, the process 300 can move to step 312, wherein the replay debugger can check to see if execution of the simulation has been completed. Completion of the execution of the simulation can either occur when a pre-determined amount of time has expired since the execution was started at step 302 or, in some examples, can end when the end of the program itself is encountered during execution. If the execution of the simulation is determined to have been completed, the process can move to step 314, wherein the process 300 is terminated. In one or more examples, terminating the process at 314 can include storing the generated log files in memory and uploading them to the computer or computing resources on which the replay debugger resides. If execution is still on-going, the process 300 can move back to step 304, wherein a new log file is generated and the process starts over.

As discussed above, in order to debug a distributed software program, a replay debugger can use the message logs generated by the various components of a distributed computing system to diagnose issues that exist within the distributed software program. Since oftentimes, in the context of a distributed software program, a user may not have access to the entirety of the code (as it is often stored in the individual memories of the components of the system), the user can use the messages passed between the components to diagnose any issues. In one or more examples, and as described below, the user can specify one or more watch points, to search for various patterns with the messages that may be indicative of a condition that the user is looking for. Thus, with respect to watch points, if the user wants to determine if and when any specified condition occurs during the execution of a distributed software program, they may want to quickly and efficiently scan the generated message logs to search for specific conditions.

Thus, when a user is specifying a watch point, in essence, they are instructing the system to parse through the various message logs to search for logs in which the condition specified by the user is true. In order to execute such a search, in one or more examples, the system can initiate a pattern search through the plurality of message log files generated during the execution of the distributed software program.

A simple example can illustrated the above concept. If a distributed system only generated four types of messages [m1, m2, m3, and m4] and a user wanted to identify all instances in which m1 came before m2 in any given log, then the user would need to review every single log file (which could be in the thousands or even tens of thousands) and search for instances in the log files in which m1 appears before m2. Such a process could be extremely labor intensive and tenuous and therefore likely not feasible to implement.

As creating watch points can be characterized as an exercise in recognizing specific patterns within text, the systems and methods described herein can utilize specific tools that have been developed for discovering patterns within large volumes of text, such as message logs generated during execution of distributed software program. Such tools, often referred to as string search algorithms or string matching algorithms, can quickly and efficiently analyze large volumes of texts to search for distinct patterns that can be specified by a user. String search algorithms can use a precise syntax to express the precise pattern to be searched within the body of text.

String search algorithms are generally configured to maximize the efficiency of a computing device to search through large volumes of text to search for distinct patterns within the text. A string search algorithm that does not take into account the processing capabilities and methodologies employed by computers can mean that the string search algorithm may not yield a computationally efficient process that can parse through a set of text quickly. In the context of the present disclosure, and specifically with respect to the replay debugger described above, not only can the string search algorithm be configured to allow for quick processing of texts, but it can also be user-friendly in that a user can use a simple syntax to allow the user to quickly and easily set up a watch point.

Regular expressions are an example of a type of string search algorithm available to search for and identify specific patterns within a large body of text. Regular expressions are a sequence of characters that can define a specific pattern to search for in text. Regular expressions are often times employed in web search engines, word processors, and programming languages to search for specific patterns. Specifically, a regular expression is a string of symbols (also referred to as correlation names or correlation variables) representing the pattern to be matched. A regular expression can be built using one or more symbols to represent characters in the search and one or more operators that specify the type of pattern to search for. Examples of operators include a concatenation operator (e.g., an "AND" operator between symbols in a regular expression may be used to indicate an AND relationship between the symbols), alternation operator (e.g., a vertical bar '|' may separate symbols in a regular expression indicating an OR condition for the symbols), quantifiers, and grouping operators (e.g., indicated by parentheses). Examples of quantifiers include an asterisk '*' that can indicate one or more occurrences of the symbol with which the quantifier is associated, a plus sign '+' that can indicate occurrences of the symbol with which the quantifier is associated, and a question mark "?" that can indicate zero or one occurrences of the symbol with which the quantifier is associated, reluctant quantifiers, as examples.

While regular expressions have proven to be a particularly useful way of specifying patterns to be search within text, it is not specified in a user-friendly manner. Regular expressions often employ convoluted and esoteric symbols and characters that are not easily understood and require a great deal of knowledge to employ. Thus, requiring that a user create a watch point by specifying a regular expression may make it more likely that the user is unable to generate a watch point or will generate a watch point riddled with syntax errors, thereby making the watch point unable to be implemented.

To illustrate the nature of regular expressions, an example is provided below. Assume that a definition file for a distributed software program includes messages m1, m2, m3, and m4. If a user, using regular expressions, desired to search a body of log messages to determine instances in which m1 occurs before m2, the regular expression for such a pattern may look like the following:

(m1\[([^,\]])+),([^,\]])+),([^,\]])+)\])((?>m1|m3|m4|)\[([^,\]])+),([^,\]])+),([^,\]])+)\])*?(m2\[([^,\]])+),([^,\]])+),([^,\]])+)\])

While the above regular expression is formatted and specified in a manner that can make the processing of such request faster and more computationally efficient, requiring a user to enter such an esoteric and complex search declaration will likely lead to a poor user experience and the inability to efficiently and effectively establish watch points.

Thus, in order to allow a user to specify their search criteria in a more user-friendly and simplistic manner, an "intermediate" or domain-specific language can be used that allows a user to specify a search in a simplistic manner. The user's specification can then be converted into a regular expression, which can then be executed by on a plurality of message logs to identify patterns that match the user's specification.

An example domain-specific/intermediate language is described below. For purposes of the discussion, the example provided below can be called Happened-Before Language (HBL) and can represent a domain specific language that can be employed by a user to specify watch points. The HBL language can be used to analyze log files. To illustrate the functionality of the HBL language, assume a distributed software program in which there are only four types of message types: m1, m2, m3, and m4. Also assume that each message type m1, m2, m3, and m4 can be sent to and from components with the example distributed system labeled c1, c2, c3, and c4. Thus, in an example, a log string and expression such as m1[c1,c3] in the HBL language can represent message type m1 being sent from component c1 to component c3.

Given the specification of HBL described above, a log string in a replay debugger can appear as follows:
m1[c1,c3] m1[c1,c2.c3] m1[c2,c1] m1[c3,*] m4[*,c3] m3[c1,c3] m1[c1,c2] m1[c1,c3] m1[c1,c3] m2[c2,c1] m1[c3,*] m4[*,c3] m2[c3,c2] m3[c1,c3]

The above string shows various message types (m1-m4) being sent by various components (c1-c4). The HBL can be configured to allow the user to search for various patterns within a set of logs. For instance, a user could enter the following command: m1→m2. The above command can specify that the user is seeking to find all instances in which m1[*,*] happens before m2[*,*]. In other words, m2 must occur and m1 must occur, though in between, any message types other than m2 can occur. If the above HBL specification is executed on the log string provided in the example above, two results (i.e., hits) can occur as indicated below:
 1. m1[c1,c3] m1[c1,c2.c3] m1[c2,c1] m1[c3,*] m4[*,c3] m3[c1,c3] m1[c1,c2] m1[c1,c3] m1[c1,c3] m2[c2,c1]
 2. m1[c3,*] m4[*,c3] m2[c3,c2]

The above hits indicate patterns in the log string in which m1 appears before m2. The user can not only search for patterns based on message type but can also search for message types sent to or from a specific component within the distributed programming system. For instance, the user can specify the following command using HBL: m1[c3,*]→m2. This command can indicate that the user wishes to search for all instances in a log string in which m1[c3,*] happens before m2[*,*]. In other words, rather than just searching for instances in which message type m1 happens before m2, the search is more specific and is seeking instances in which message type m1 is transmitted from c3 before message type m2 occurs. Using the above log string, such a query can yield the following hits:
 1. m1[c3,*] m4[*,c3] m3[c1,c3] m1[c1,c2] m1[c1,c3] m1[c1,c3] m2[c2,c1]
 2. m1[c3,*] m4[*,c3] m2[c3,c2]

In one or more examples, the user using HBL can specify specific chronological patterns of message types. In other words, rather than just specifying patterns in which m1 occurs before m2, a user can specify to what degree m1 should come before m2. For example, if a user specifies the following HBL command: m1[→2] m2, then the system can search for all instances in a specified log string in which m1[*,*] happens exactly two messages before m2[*,*]. In other words, m2 must occur, and any two message types can occur, and then m1 must occur. Using the log string example above, the following hit can be produced:
 1. m1[c1,c2] m1[c1,c3] m1[c1,c3] m2[c2,c1]

In another example, the HBL language can also be configured to allow the user to specify negative conditions. For instance, a user can set up a watch point by issuing the following command: m1↛m2. This command can indicate that the user wishes to search for all instances in a log string in which m1[*,*] happens before m1, m3, or m4. Alternatively stated, m1, m3, or m4, but not m2, occurs after m1. A substring of the log string that starts with m1 and ends with anything but m2 is a match. This substring will not include the ending message type of "anything but m2." Note that there could be more than two message types in matches. Using the log string example from above, the above command can produce the following hits:
 1. m1[c1,c3] m1[c1,c2.c3]
 2. m1[c1,c2] m1[c1,c3]
 3. m1[c3,*] m4[*,c3]

In one or more examples, the HBL language can employ variable expressions. In one or more examples, variable expressions can be constructed with variables using the following operators: NOT (!), AND (&&), OR (||), ==, <, >. Therefore, a variable expression is an assertion that can evaluate to a Boolean value. In one or more examples, a variable expression can be used to identify events in which a variable is of a certain value or range of values. Variable expressions can be evaluated on every log file, or in one or more examples can be evaluated in log files containing certain types of messages. For example, a variable expression that is combined with a → expression, can indicated that the variable expression is only to be evaluated on specific messages corresponding to a matched substring, and may not be evaluated on other logs. More specifically, when combined with a → relationship, a variable expression may be evaluated based on the semantics of as shown below.

m1→((c1.var1==5) && (m2.var3>32.2)) asserts that the variable expression will evaluate to true at some time after m1 occurs.

m1→m2((c1.var1==5) && (var3>32.2)) asserts that the variable expression will evaluate to true at some time after m1 occurs. Note that "var3" is unqualified, and therefore is interpreted as "m2.var3" using the "m2" outside of the parenthesis.

m1→[0] ((c1.var1==5) && (m2.var3>32.2)) asserts that the variable expression will evaluate to true immediately after m1 occurs.

m1[→5] ((c1.var1==5) && (m2.var3>32.2)) asserts that in the sixth log message prior to when the expression ((c1.earl==5) && (m2.var3>32.2)) evaluates to true is of message type m1.

m1[→5] m24 [0] ((c1.var1==5) && (m2.var3>32.2)) asserts that the variable expression will evaluate true immediately after m2 that occurs 5 message types after m1.

The above examples are provided only for purposes of illustration and should not be construed as limiting. Furthermore, the above examples illustrate only a portion of the HBL's capabilities, and the HBL can be configured to allow a user to specify other types of patterns not discussed above.

Figure 4:
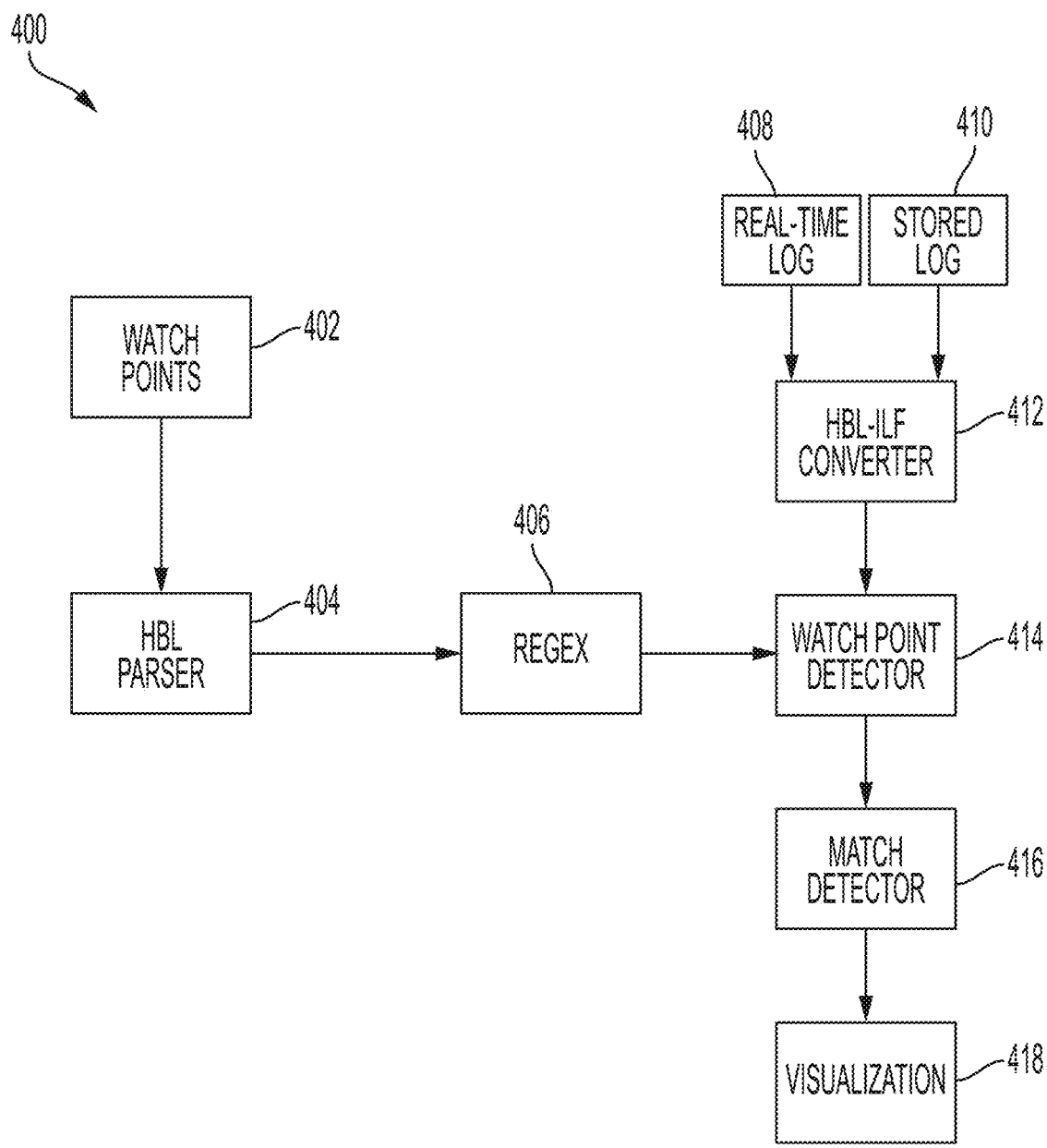
FIG. 4 illustrates an exemplary system for generating a watch point within a replay debugger graphical user interface according to examples of the disclosure.

FIG. 4 illustrates an exemplary watch point creation system according to examples of the disclosure. The system 400 can include one or more watch points 402, which can be generated by a user using a domain-specific language, such as the example of HBL provided above. In one or more examples, the watch points 402 created by one or more users as described above can be stored in a memory (not pictured). In this way, the watch points can be made more easily available to other components of the system 400 for further processing.

The system 400 can also include a parser 404. In the example of the system 400, the parser 404 can be an HBL parser that is specifically configured to work with watch points that are declared by a user using the HBL language as described above. The parser 404 can parse each watch point 402 and determine if the watch point 402 contains one or more syntax errors. The parser 404 can also parse each watch point 402 to determine whether or not the watch point contains an incomplete specification, an inconsistent specification, or an incorrect specification. In other words, the parser 404 can parse each and every watch point 402 to determine if the watch point contains one or more errors that may prevent the system from identifying matching patterns in the log file.

If the parser 404 determines that such an error exists within one or more of the watch points 402, the parser 404 can generate an error message to the user indicating that one or more errors exist in the watch point.

Once the parser 404 has parsed each watch point 402 to detect any errors in how the watch point 402 was specified, the watch points 402 can be converted into a regular expression (described above) by a converter 406, which can then be applied to the log files. The converter 406 can employ one or more algorithms that effectively map HBL expressions into regular expressions. The regular expressions generated by the converter 406 can then be applied to the log files (as discussed below).

In parallel to the creation of the watch points 402, and their conversion to regular expressions, the log files generated by execution of a distributed software program can be stored and converted into an intermediate format that can be searched by the regular expressions. Thus, the system 400 can include real-time log generator 408 and stored log generator 410. Real-time log generator 408 can generate log files during the real-time execution of a distributed software program as described above. Likewise, stored log generator 410 can also generate log files based on a prior execution of a distributed software as described above.

Both the real-time log files 408 and the stored log files 410 can be converted into an intermediate log format (ILF) prior by ILF converter 412. In one or more examples, ILF can refer to any custom written mapping software that can convert a raw stream of data to a particular format. Thus, in one or more examples, the systems and methods described herein can be used to detect events in any raw data stream. Since regex processing can depend on a standardized representation of log files, the ILF converter 412 can convert the log files provided by elements 408 and 410 into a format that is easier and more efficiently searched using the regular expressions generated by converter 406 (i.e., HBL Intermediate Log format). A system may generate HBL ILF format compliant records or logs natively, or alternatively in one more examples the native generated logs can be translated to HBL ILF formatted logs.

The system 400 can also include a watch point detector 414. The watch point detector 414 can take at its inputs the ILFs produced at element 412 and the regular expressions generated by the converter 406. The watch point detector 414 can apply the regular expressions to the ILFs and generate detection triggers and matching log records in the ILF.

Watch point detector 414 can then transmit the matching log records from the ILF and the original real-time logs and stored logs generated by elements 408 and 410 to a match detector 416. The match detector 416 can use the matching log records from the ILF to find the matching log records in the real-time and stored logs.

Once the matching log records are found by the match detector 416, the identified matching logs can be transmitted to a visualization unit 418. Visualization unit 418 can translate the determined matches into visualizations that can be applied to a graphical user.

Figure 5:
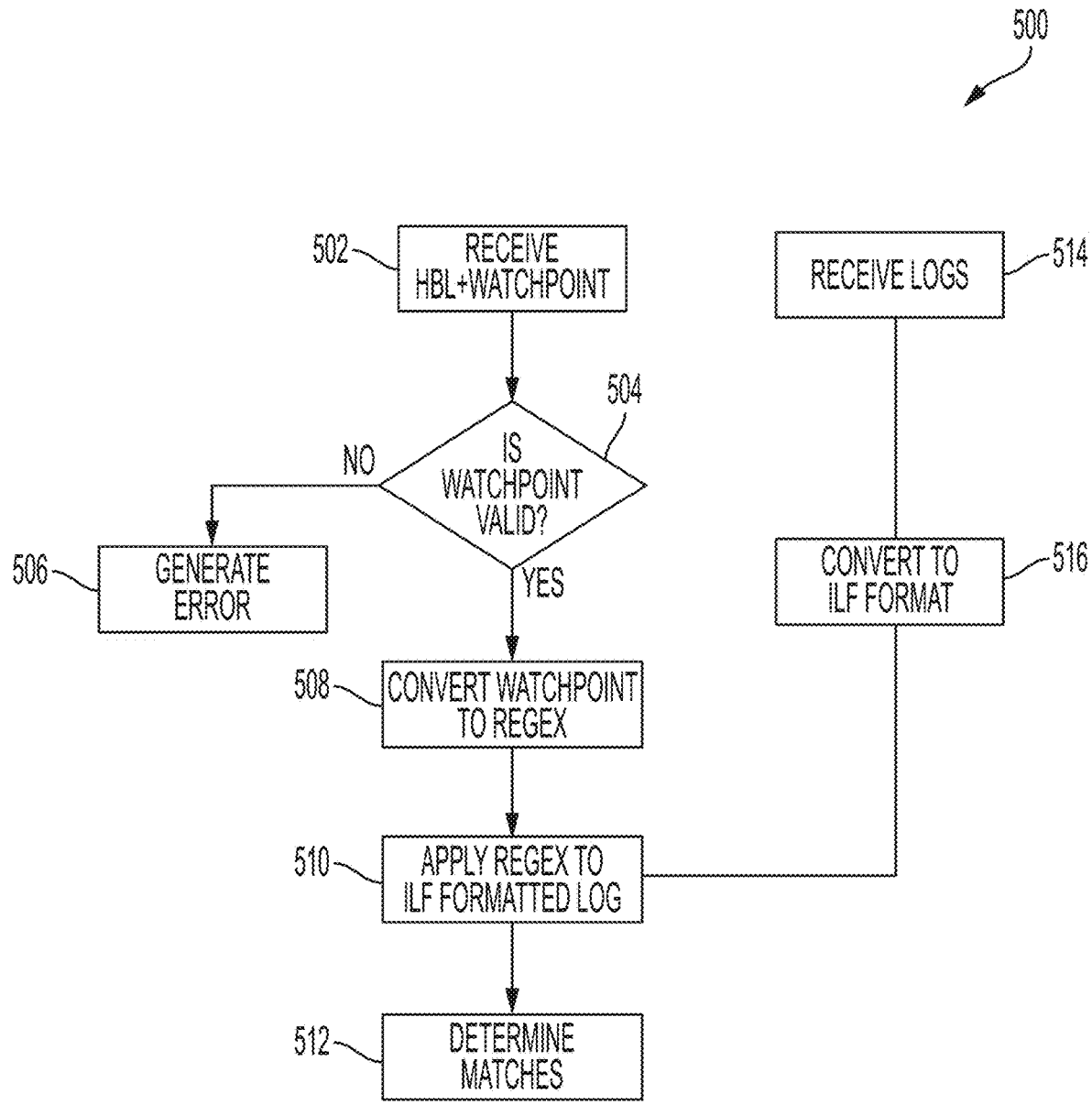
FIG. 5 illustrates an exemplary method for identifying patterns in a plurality of log files of a replay debugger according to examples of the disclosure.

FIG. 5 illustrates an exemplary method for identifying patterns in a plurality of log files of a replay debugger according to examples of the disclosure. The method 500 can be implemented in one or more examples by the system described above with respect to FIG. 4. The method 500 can begin at step 502, wherein one or more watch points are received by a user of a replay debugger. The one or more watch points can be specified using a domain-specific language such as HBL, as described above.

After receiving the watch points at step 502, the process can move to step 504, wherein a determination can be made as to whether the one or more watch points received at step 502 are valid. As described above with respect to FIG. 4, a watch point can be analyzed at step 504 to determine whether the watch point contains any syntax errors, incomplete specification, inconsistent specifications, or incorrect specifications. If it is determined at step 504 that watch points contain one or more errors as described above, the process can move to step 506, wherein the user is alerted to the error in the watch point.

If however, the watch point is found to not detect any errors at step 504, the process can move to step 508, wherein the watch point is converted from the domain-specific language such as HBL into a regular expression that will be ultimately used to search for matching patterns in the log files.

In parallel to receiving the watch points at step 502, the method 500 can also receive one or more log files at step 514. The log files received at step 514 can be generated from the execution of a distributed software program either in real time or at an earlier time as described above. Once the log files have been received, the method 500 can move to step 516, wherein the log files can be converted into an ILF as described above with respect to FIG. 4.

Once the domain specific language specified watch points have been converted to regular expressions at step 508, and the ILFs have been created at step 516, the process can move to step 510, wherein the regular expressions can be applied to the ILFs. In other words, at step 510, the regular expressions are used to search for matching patterns in the ILFs.

After the regular expressions are used to find corresponding matches in the ILFs at step 510, the process can move to step 512, wherein the matches found in the ILFs are used to determine matches in the corresponding log files received at step 514, as described above with respect to FIG. 4. In other words, the matching patterns found in the ILFs are then identified within the original log files received at step 514. In this way, the patterns in the log files that match the conditions specified by the watch points are identified.

Figure 6:
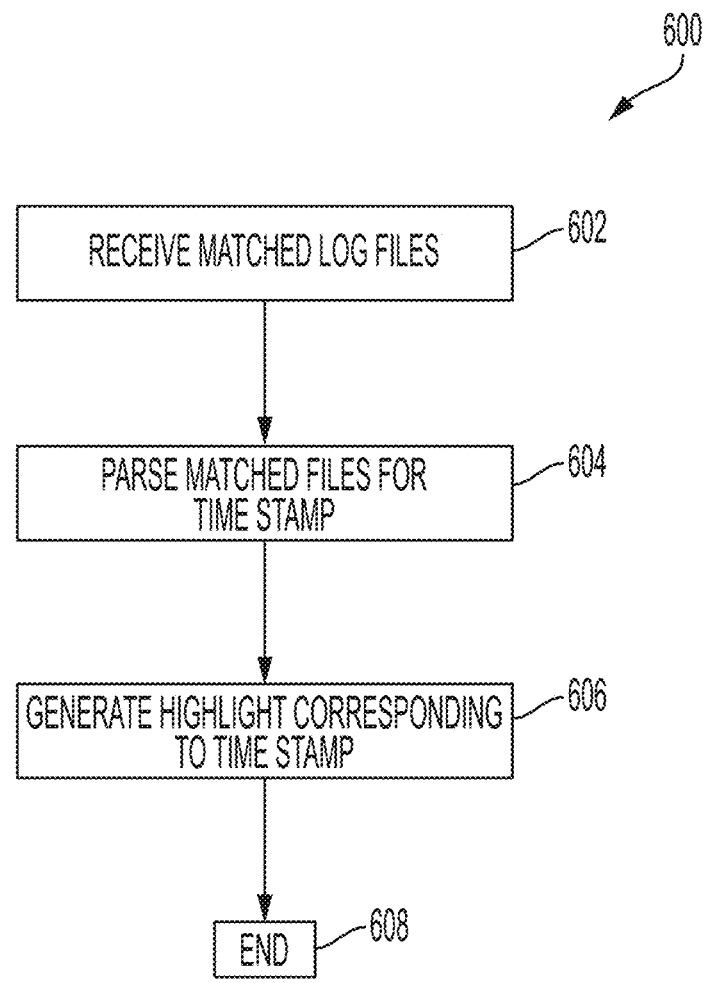
FIG. 6 illustrates an exemplary method for generating a visualization of a watch point within a replay debugger according to examples of the disclosure.

FIG. 6 illustrates an exemplary method for generating a visualization of a watch point within a replay debugger according to examples of the disclosure. The method 600 can begin at step 602, wherein the log files that match the specified watch points can be received.

Once the matching log files have been received, the process can move to step 604, wherein each matching log file can be parsed to extract a time stamp corresponding to the log file. As described above, each log file can include a time stamp that indicates the chronological time during the execution of the distributed software program in which the log file was generated. Thus, at step 604, each log file that includes a pattern that matches the user-specified watch point can be examined to determine at what point in time during execution of the distributed software program the log file was generated.

Based on the extracted time stamps, the process can move to step 606, wherein a highlight or highlights are generated on a graphical user interface that correlates with the chronological time stamp extracted at step 604. In this way, the user is alerted to the moments in time during the execution of the distributed software program that the condition that they specified using the watch point occurs. Once the visualization has been provided at step 606, the method 600 can move to step 608, wherein the process is terminated. The conclusion of method 600 thus yields a visual reference on a graphical user interface that can allow the user to visually see the moments during an execution of a distributed software program in which a specified watch point occurs.

The systems and methods described above while providing a robust solution to replay debugging, may not be sufficient in some contexts. For instance, the above systems and methods use log files created during the operation of a distributed software system to perform the analysis. This can mean that the system must wait for the log files to be generated and stored before the system can perform the necessary analysis to detect alert conditions specified by the watch points created by a user. The latency between when a condition in a watch point occurs, and when the log file can be generated, can mean that an error of interest may not be detected until time a significant time has passed since the log file must first be generated before an analysis can occur. Thus in one or more examples, the ability to analyze the actual data stream between nodes in a distributed computing system running a distributed software program can be beneficial, as it allows for near real-time detection of conditions that the user may want to be alerted to.

In the systems and methods described above, in which log files are analyzed, the log files generated by each of the nodes in a distributed system can be transmitted to a central server wherein a replay debugger can use the transmitted log files to perform debugging analysis on the log files. In one or more examples, the log files generated by each node in a distributed computing system can be stored in a database, and the replay debugging analysis can be implemented by having the debugger perform a query against the database. This process can thus add more latency to the debugging process because not only do the log files have to be generated at each node, but they must also be transmitted to a central server for further processing.

Given the limitations described above, it can be beneficial to analyze the actual data streams being transmitted between nodes in a distributed computing system rather than analyzing the log files of communications between transmitted between nodes. A system and method for analyzing streams of data can present challenges because a centralized architecture in which a central server or processor analyzes all of the communications in a distributed computing network may not lend itself well to a system that analyzes streaming data versus a system that analyzes log files that can represent a summary of the communications between nodes. Thus, in order to implement a debugging system that can analyze streams, the system may need to be decentralized. In other words, the analytics associated with a reply debugger may need to be performed at least in part at the location of the communications, rather than in a centralized location.

Figure 7:
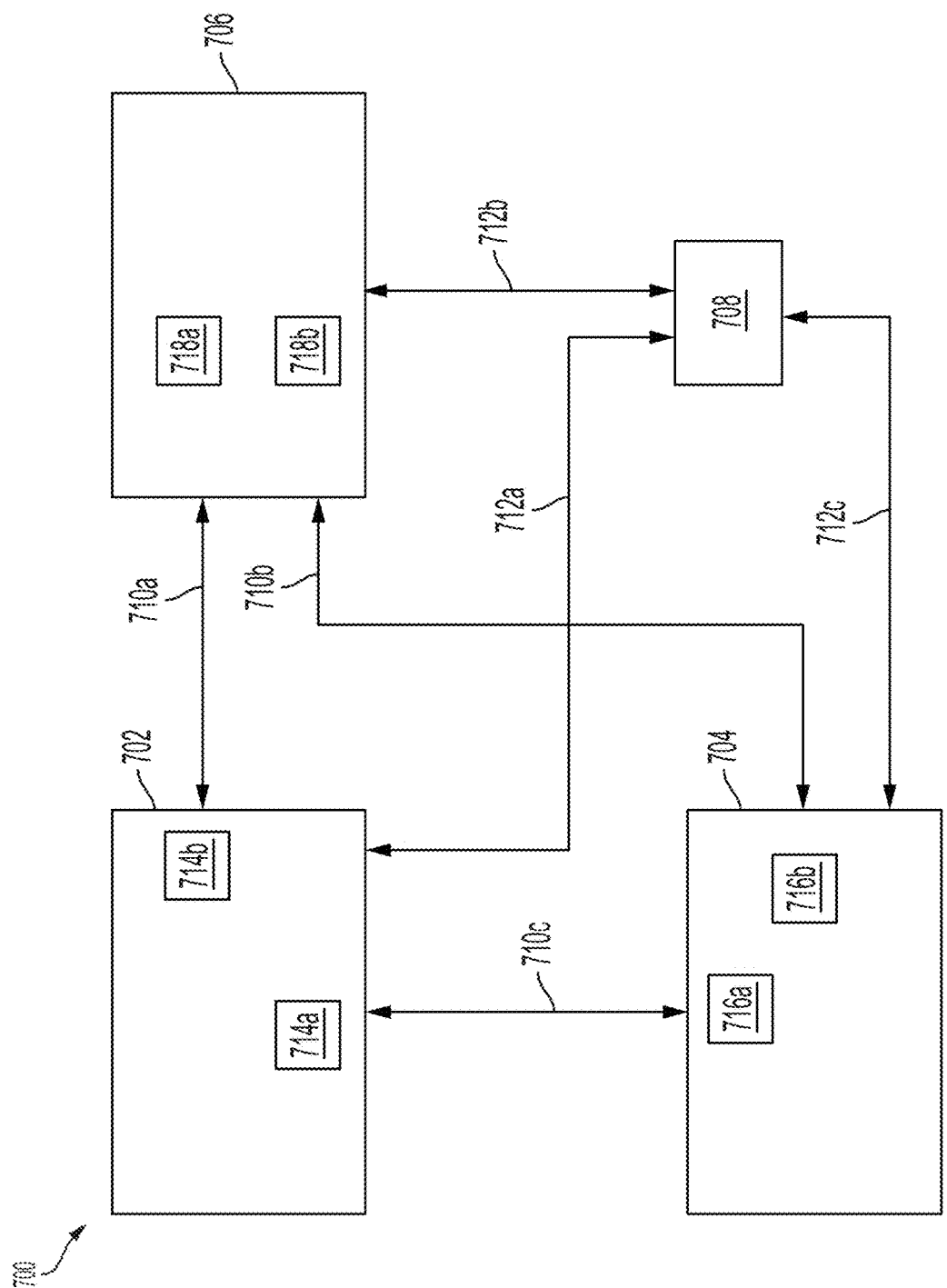
FIG. 7 illustrates an exemplary distributed computing system configured to perform replay debugging on streaming data according to examples of the disclosure.

FIG. 7 illustrates an exemplary distributed computing system configured to perform replay debugging on streaming data according to examples of the disclosure. The example of FIG. 7 illustrates a distributed computing system 700 similar to the example of FIG. 1 that includes a plurality of computing elements 702, 704, and 706. In one or more examples, and similar to FIG. 1, elements 702, 704, and 706 can be part of a distributed software system in which a single software program is implemented across multiple elements (i.e., "nodes").

In one or more examples, during operation of the distributed software system, elements 702, 704, and 706 can transmit data to one another. Thus in the example of system 700, element 702 and element 704 can communicate data with one another via communications link 710*c*. Element 702 can communicate with element 706 via communications link 710*a*, and element 706 can communicate with element 704 using communications link 710*b*. In one or more examples, communications links 710*a-c* can be implemented using conventional wired or wireless communications protocols such as Ethernet, WiFi, Bluetooth, etc.

In one or more examples, the system 700 can include a central processor 708 that can be configured to implement a replay debugger that can be used to evaluate system 700 during operation of the distributed software system. In one or more examples, central processor 708 can be configured to transmit and receive communications from each of element 702, 704, and 706 via communications links 712*a*, 712*b*, and 712*c* respectively. In one or more examples, and as described in detail below, central processor 708 can work in conjunction with software elements located at each elements 702, 704, and 706 so as to provide replay debugging capabilities on streaming data between each of the elements in the distributed software system.

As discussed above, a system that is configured to analyze streams of data in real-time rather than analyzing stored log-files can be implemented by distributing some of the analytical functions of a replay debugger to each of the computing devices in a distributed system. Thus in one or more examples, each element 702, 704, and 706 (in addition to including a CPU and memory, not pictured) can include one or more detections engines. As described in further detail below, each of the detections engines implemented on an element of the distributed computing system can be configured to receive streaming data, and perform a preliminary analysis on the streaming data to determine if the streaming data matches or "partially" matches any of the watch points specified by a user.

In one or more examples, a detection engine can be implemented for each and every data stream transmitted by a specific element (i.e., node) of the distributed computing system. For instance, element 702 can include detections engines 714a and 714b. In one or more examples, detection engine 714a can be configured to implement debugging analysis on the communications to be transmitted to element 704 via communications link 710c. Element 702 can include a detection engine 714b which can be configured to implement debugging analysis on the communications to be transmitted to element 706.

With respect to element 704, the component can also include two detection engines 716a and 716b. In one or more examples, detection engine 716a can be configured to implement debugging analysis on the communications to be transmitted to element 702 via communications link 710c. In this way, a separate detection engine can be implemented for both sides of a given communications link. In the example of system 700, detection engine 714a can be implemented in element 702 to perform replay debugging analysis on communications emanating from element 702 to element 704 via communications link 710C. Detection engine 716a can be implemented in element 704 to perform replay debugging analysis on communications emanating from element 704 to element 702. Thus, both sides of a communications link can, in one or more examples, have its own detection engine to monitor a specific stream of communications. Element 702 can include a detection engine 714b which can be configured to implement debugging analysis on the communications to be transmitted to element 706. In one or more examples, Element 706 can include detections engines 718a and 718b. Detection engine 718a can be configured to perform streaming analysis on data transmitted from element 706 to element 702 via communication link 710a, while detection engine 718b can be configured to perform analysis on data transmitted from element 706 to element 704 via communications link 710b.

In one or more examples, each detection engine 714a-b, 716a-b, and 718a-b can be implemented as a software container that can be spun up or brought down based on one or more conditions of the elements in the distributed computing system 700. For instance, if a new element is introduced to a distributing system, then a new detection engine implemented in a container can be created so as to capture a data stream and perform debugging analysis on the data stream.

As described above, each of element 702, 704, and 706 can be connected to central processor 708 via communications link 712a-c respectively. In one or more examples, central processor 708 can transmit watch points generated by a user to each of the elements 702, 704, and 706 and can also receive watch point matches found at each of the elements as well.

As described above, each detection engine of the system 700 can be configured to analyze their respective data streams to find matches with one or more watch points specified by a user of the system. Unlike log files, streaming data can be received intermittently and at aperiodic intervals thereby complicating the analysis process. In order to account for this fact, in one or more examples, the detection engines of system 700 can be configured to "window" the received data, and can also be configured to store matches or partial matches with watch points to ensure that matches within a stream are not discarded.

Figure 8:
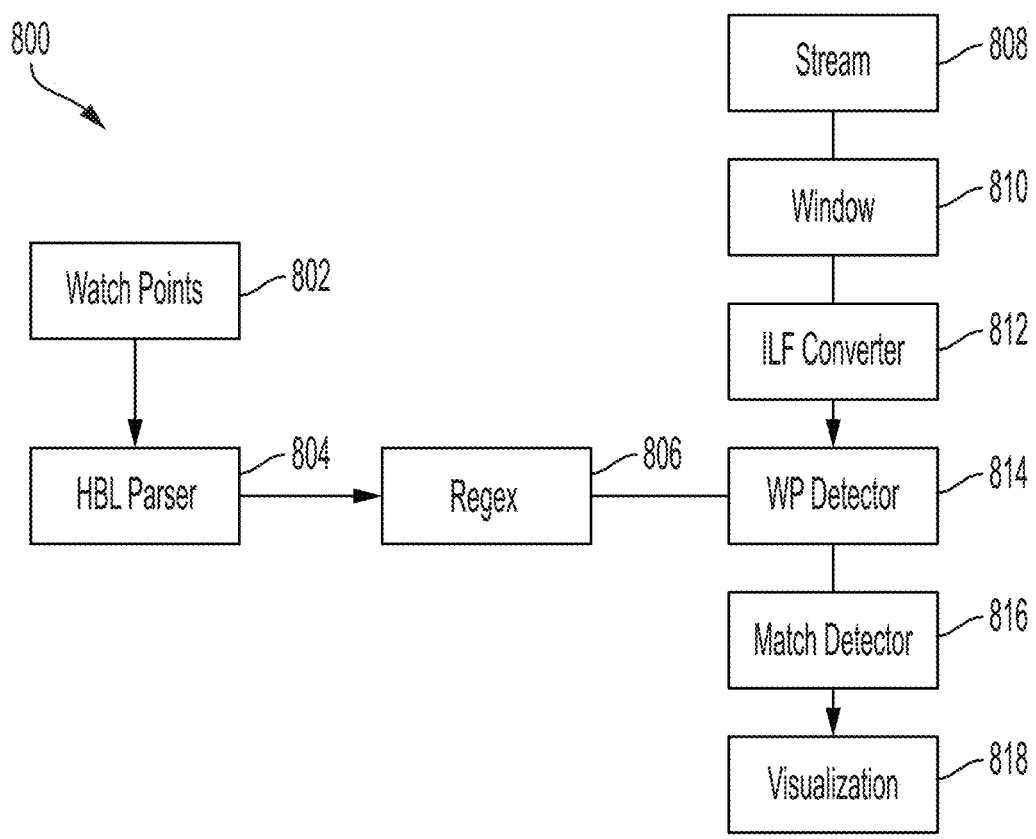
FIG. 8 illustrates an exemplary system for generating a watch point within a replay debugger graphical user interface adapted to monitor streaming data according to examples of the disclosure.

FIG. 8 illustrates an exemplary system for generating a watch point within a replay debugger graphical user interface adapted to monitor streaming data according to examples of the disclosure. The system 800 can include one or more watch points 802, which can be generated by a user using a domain-specific language, such as the example of HBL provided above. In one or more examples, the watch points 802 created by one or more users as described above can be stored in a memory (not pictured). In this way, the watch points can be made more easily available to other components of the system 800 for further processing. In one or more examples, and referring to the example of FIG. 7, each watch point can be created by a user at central processor 708, and transmitted to each of the elements in the distributed computing system for processing on each stream by each detection engine within an element.

The system 800 can also include a parser 804. In the example of the system 800, the parser 804 can be an HBL parser that is specifically configured to work with watch points that are declared by a user using the HBL language as described above. The parser 804 can parse each watch point 802 and determine if the watch point 802 contains one or more syntax errors. The parser 804 can also parse each watch point 802 to determine whether or not the watch point contains an incomplete specification, an inconsistent specification, or an incorrect specification. In other words, the parser 804 can parse each and every watch point 802 to determine if the watch point contains one or more errors that may prevent the system from identifying matching patterns in the log file.

If the parser 804 determines that such an error exists within one or more of the watch points 802, the parser 804 can generate an error message to the user indicating that one or more errors exist in the watch point. Once the parser 804 has parsed each watch point 802 to detect any errors in how the watch point 802 was specified, the watch points 802 can be converted into a regular expression (described above) by a converter 806, which can then be applied to a data stream which are now in the form of intermediate log files. The converter 806 can employ one or more algorithms that effectively map HBL expressions into regular expressions. The regular expressions generated by the converter 806 can then be applied to the log files (as discussed below).

In parallel to the creation of the watch points 802, and their conversion to regular expressions, the data streams generated by execution of a distributed software program can be stored and converted into an intermediate format that can be searched by the regular expressions. Thus, the system 800 can include data stream receiver 808, and data stream window generator 810. In one or more examples, upon receiving a data stream the data can be stored in a buffer (i.e., temporary memory such as cache) for further processing. In order to create intermediate log files from the streaming data, the streaming data can be "windowed" meaning that a subset of the data received can be converted into a data set that can later be converted into an intermediate log format. In one or more examples, when data is received at 808, the system as described above can store the received data in a buffer. The window generator 810 can process the data in the buffer by selecting data in the buffer corresponding to one or more time windows. In one or more examples, the window generator 810 can implement a sliding window in which the window can slide such that each window contains data overlapping with data in a window earlier in time. In one or more examples, the sliding window can be implemented spatially such that each window includes mutually exclusive data stored within the buffer.

Each window generated by window generator 810 can be converted into an intermediate log format (ILF) prior by ILF converter 812. Since Regex processing can depend on a standardized representation of log files, the ILF converter 812 can convert the streaming data provided elements 808 and 810 into a format that is easier and more efficiently searched using the regular expressions generated by converter 806 (i.e., HBL Intermediate Log format). A system may generate HBL ILF format compliant records or logs natively, or alternatively in one more examples the native generated logs can be translated to HBL ILF formatted logs.

The system 800 can also include a watch point detector 814. The watch point detector 814 can take at its inputs the ILFs produced at element 812 and the regular expressions generated by the converter 806. The watch point detector 814 can apply the regular expressions to the ILFs and generate detection triggers and matching log records in the ILF.

Watch point detector 814 can then transmit the matching log records from the ILF and the data stream. In one or more examples, match detector 816 can determine if the one or more intermediate log files generated by converter 812 includes a match to one or more watch points or may contain one or more partial matches to the watch points specified at watch point detector 814. In one or more examples, if match detector 816 detects that the window being analyzed is a complete match to a watch point or regex expression, then in one or more examples, the match detector 816 can store the window in a memory for further processing, and in one or more examples can instantly alert a user to the match. Additionally, in one or more examples, if the window being analyzed partially matches a watch point or regex expression, then that window can also be stored by the system 800 in memory. In this way, when subsequent windows are analyzed by match detector 816, they can not only be analyzed to determine if they contain full or partial matches to the watch points or regex expressions, but they can also be analyzed to determine if they complete previously found "partial matches." A more detailed discussion of the matching process can be found below.

In one or more examples, by discarding data that does not match any of the watch points, the system in general can be required to store less data, and can transmit only the matching data to the central processor for further analysis.

Once the matching log records are found by the match detector 816, the identified matching logs can be transmitted to a visualization unit 818. In one or more examples, the visualization unit 818 can be implemented either at the element containing the detection engine, or can be implemented at the central processor. Visualization unit 818 can translate the determined matches into visualizations that can be applied to a graphical user interface.

Figure 9:
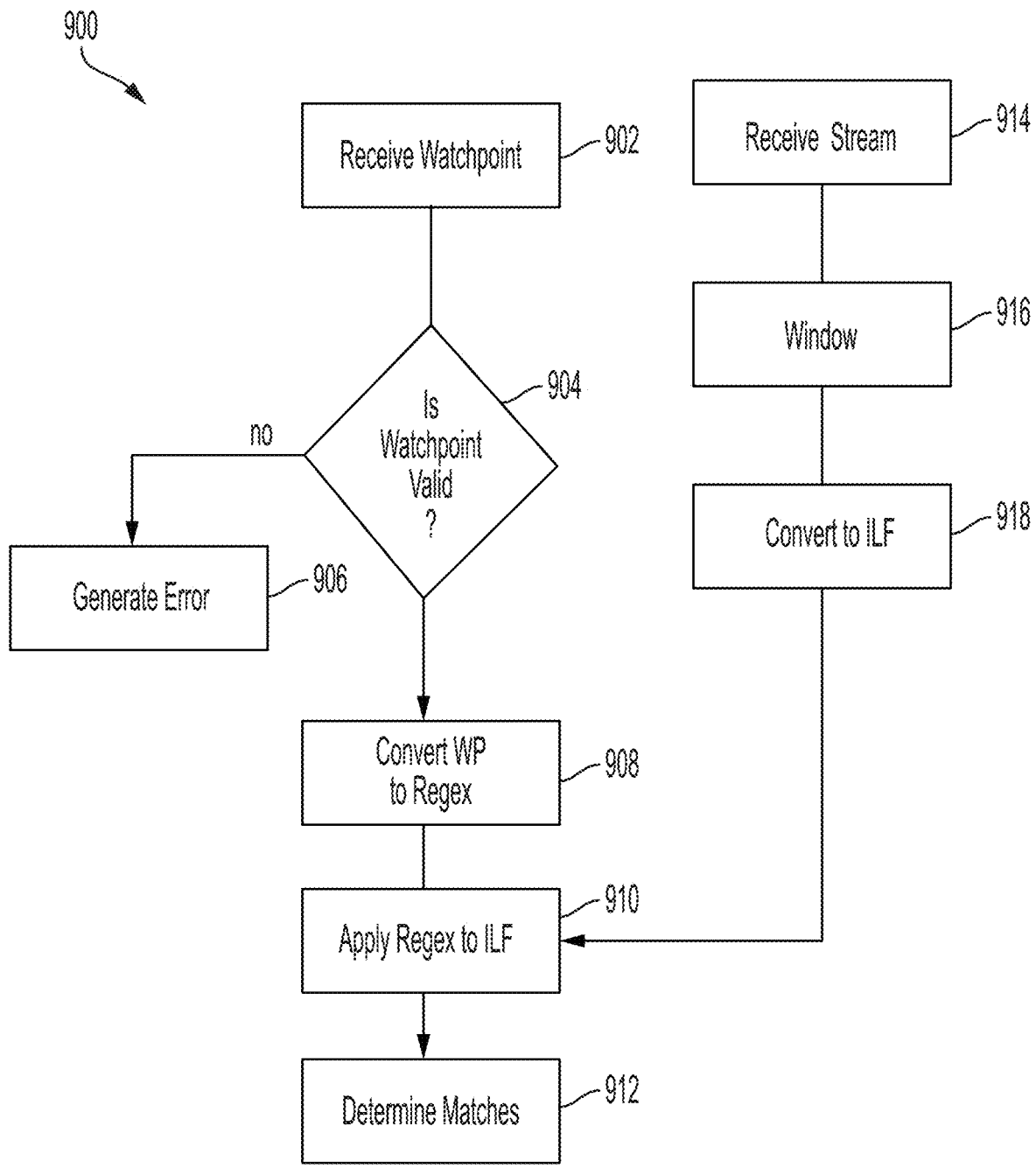
FIG. 9 illustrates an exemplary method for identifying patterns in a stream of communications between nodes of a distributed computing system according to examples of the disclosure.

FIG. 9 illustrates an exemplary method for identifying patterns in a stream of communications between nodes of a distributed computing system according to examples of the disclosure. The method 900 can be implemented in one or more examples by the system described above with respect to FIG. 5. The method 900 can begin at step 902, wherein one or more watch points specified by a user is received. The one or more watch points can be specified using a domain-specific language such as HBL, as described above.

After receiving the watch points at step 902, the process can move to step 904, wherein a determination can be made as to whether the one or more watch points received at step 902 are valid. As described above with respect to FIG. 8, a watch point can be analyzed at step 904 to determine whether the watch point contains any syntax errors, incomplete specification, inconsistent specifications, or incorrect specifications. If it is determined at step 904 that watch points contain one or more errors as described above, the process can move to step 906, wherein the user is alerted to the error in the watch point as described above with respect to FIG. 8.

If however, the watch point is found to not detect any errors at step 904, the process can move to step 908, wherein the watch point is converted from the domain-specific language such as HBL into a regular expression that will be ultimately used to search for matching patterns in the log files.

In parallel to receiving the watch points at step 902, the method 900 can also receive one or more data streams at step 914. The data streams received at step 914 can be generated from the execution of a distributed software program either in real time or at an earlier time as described above and can be stored in a buffer as described above. Each data stream received at step 914 can be windowed at step 916 as described above with respect to FIG. 8. Once the data stream has been windowed, the method 900 can move to step 918, wherein the windows can be converted into an ILF as described above with respect to FIG. 8.

Once the domain specific language specified watch points have been converted to regular expressions at step 908, and the ILFs have been created at step 918, the process can move to step 910, wherein the regular expressions can be applied to the ILFs. In other words, at step 910, the regular expressions are used to search for matching patterns in the ILFs.

After the regular expressions are used to find corresponding matches in the ILFs at step 910, the process can move to step 912, wherein the matches found in the ILFs are used to determine matches in the corresponding windows generated at step 916, as described above. In other words, the matching patterns found in the ILFs are then identified within the original windows generated at step 916 and in the manner described above. In this way, the patterns in the streaming data that match the conditions specified by the watch points are identified.

As described above, the process of determining matches with watch points can present challenges when dealing with streaming data. This can be because the data is streaming, and so it may take time for certain matching data to emerge from a data stream. In other words, a first window of streaming data may partially match a watch point condition, however in order to know if the event matches a watch point criteria, subsequent windows may need to be analyzed to see if they continue the pattern identified by the watch point. Thus, in one or more examples, the detection engines or processors determining matches with watch points may need to be able to account for the emerging nature of matches in streaming data.

Figure 10:
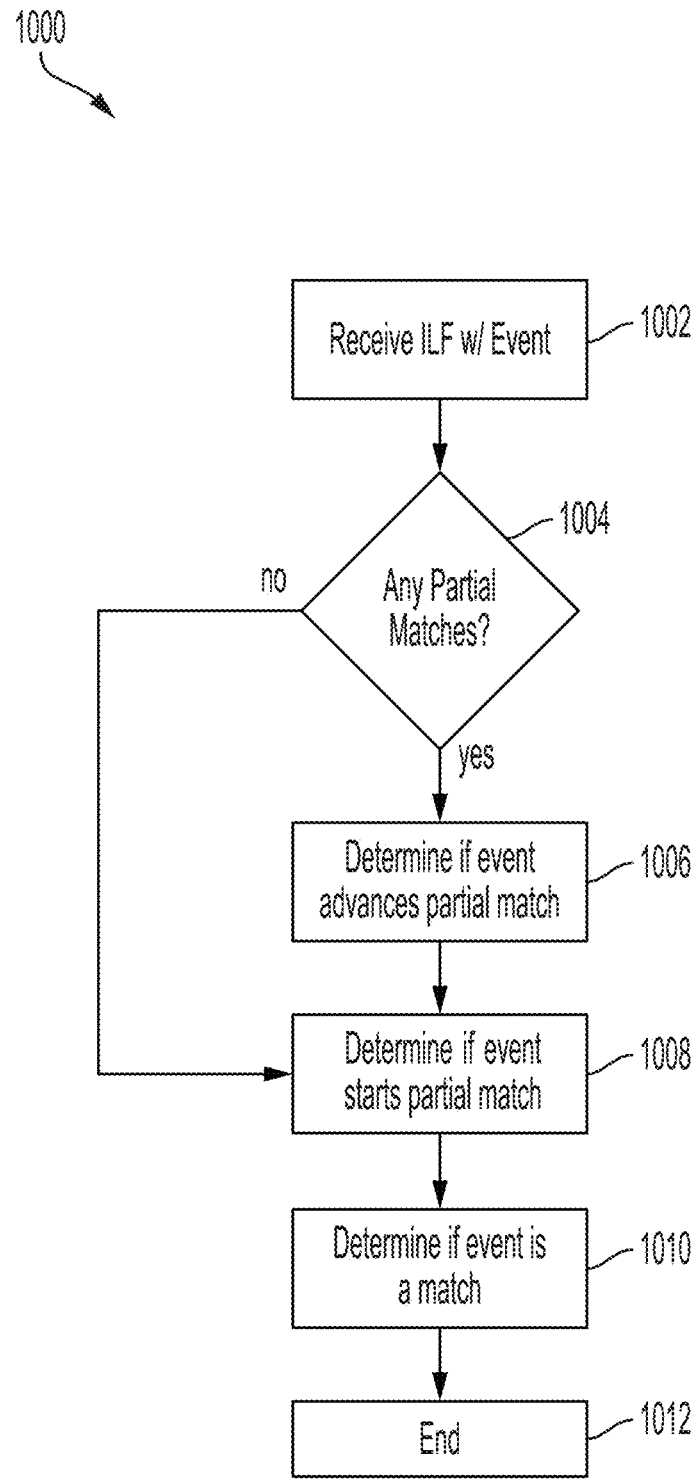
FIG. 10 illustrates an exemplary process for determining matches to a pattern in a stream of communications between nodes of a distributed computing system according to examples of the disclosure.

FIG. 10 illustrates an exemplary process for determining matches to a pattern in a stream of communications between nodes of a distributed computing system according to examples of the disclosure. In one or more examples, the process 1000 illustrated in FIG. 10 and described in further detail below can be used to compare streaming data with watch points to determine the presence of events that the user may want to be alerted about.

In one or more examples, the process 1000 can begin at step 1002 wherein an intermediate log file corresponding to a window is received. As discussed above with respect to FIGS. 8 and 9, a "window" of streaming data can be converted into an intermediate log file (ILF) for the purpose of comparison to a watch point or HBL expression. Thus, at step 1002, the process 1000 can receive the generated ILF, which may include one or more events that occurred in the streaming data corresponding to the ILF.

Once the ILF file has been received at step 1002, the process can move to step 1004 wherein the system can determine if there are any pre-existing partial matches that have been previously stored by the system. As described above, as streaming data is generated by a distributed computing system, the data may initially partially match a watch point. For example, if a watch point required the presence of event A, then event B, and then event C, then as the data in a distributed system is being generated, at first the streaming data may initially match event A, but further data will be needed to see if the data eventually matches B then C in order for an alert to be generated. Thus, in one or more examples, at step 1004 the system can first determine if there are any previously identified partial matches that are stored in the system, thus requiring that the received ILF file received at step 1002 be analyzed to see if the event in the ILF advances the partial match. Using the example above, if previous ILF files matched event A, then the received ILF file would have to be analyzed to determine if the file matched event B, thereby advancing the partial match to a watch point that included A, B, and C.

In one or more examples, if a partial match is already stored in the system as determined at step 1004, then the process can move to step 1006, wherein a determination is made as to whether the event received in the ILF file at step 1002 advances any of the stored partial matches. As described above, advancing a partial match can refer to whether the event found in an ILF continues or completes an already partial match found in a watch point and stored by the system. At step 1006, if it is determined that the ILF under examination advances a partial match, then in one or more examples, the ILF file can be stored in a memory. Furthermore, in one or more examples, if the ILF under examination completes an already stored partial match, then in one or more examples, the ILF file can be stored in a memory, and an alert can be transmitted to a user of the system, alerting them to the presence of a condition in the streaming data that matches a predefined watch point.

Referring back to step 1004, if there are no previously stored partial matches, then in one or more examples, the process 1000 can skip step 1006 and move directly to step 1008 from step 1004. Additionally or alternatively, once a determination has been made to determine if an event expressed in a received ILF advances any previously stored partial matches at step 1006, the process can move to step 1008. At step 1008, a determination can be made as to whether the ILF event received at step 1002 is the beginning of a partial match to a watch point. Using the example above of a watch point requiring event A, then event B, then event C, at step 1008 the process 1000 can determine if the event expressed in the ILF received at step 1008 matches event A, thereby indicating the beginning partial match of pattern expressed in the watch point.

In one or more examples, at step 1008, if it is determined that the ILF partially matches a pattern expressed in one or more watch points, then the ILF can be stored in the memory of the system so that subsequent ILFs can be reviewed at step 1006 to see if the partial match identified currently at step 1008 have been advanced. In one or more examples, if the event does not start a partial match at step 1008, then the ILF can be discarded. In one or more examples, once process 1000 at step 1008 has determined whether the ILF received at step 1002 partially matches the beginning of a watch point pattern, the process can move to step 1010 to determine if the ILF completely matches a pattern expressed in a watch point. If at step 1010 the process matches a watch point pattern, then the system can transmit an alert to a user as described above with respect to FIGS. 8-9. Finally, in one or more examples, and once the ILF received at step 1002 has been analyzed to determine if it is a continuation of a previously found partial plan, a beginning partial match to a watch point, and/or a complete match to a watch point, the process 1000 can move to step 1012 wherein the process is terminated.

As described above, the speed required to perform debugging analysis on a data stream rather than on log files can require that all or some of the analytics be performed at the nodes of a distributed computing system, in contrast to a system in which the debugging analysis can be performed at a central processor. Distributing the analytics across nodes can be referred to as "edge computing." Edge computing can refer to the process of moving computation and data storage closer to the locations where it is needed rather than performing the entirety of the processing at a central location. As described in detail below, various edge computing architectures can be realized to facilitate the ability to perform debugging analysis on streaming data.

FIG. 11A-J illustrate exemplary architectures for implementing an edge computing detection scheme to identify patterns in a stream of communications between nodes of a distributed computing system according to examples of the disclosure. The examples provided by FIG. 11 can be implemented to facilitate streaming analytics on a distributed computing system as described with respect to FIGS. 7-9, but additionally, the examples provided in FIG. 11 can also be utilized to implement analysis on log files in the system and methods described above with respect to FIGS. 4-5.

Figure 11A:
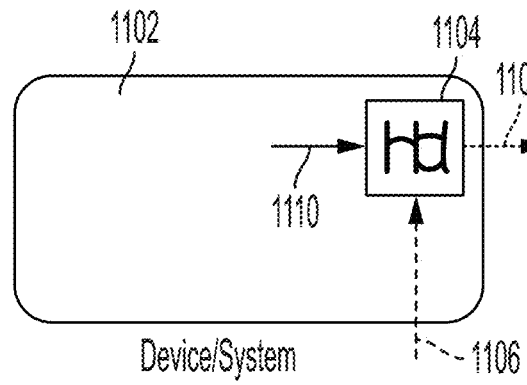
FIG. 11A-J illustrate exemplary architectures for implementing an edge computing detection scheme to identify patterns in a stream of communications between nodes of a distributed computing system according to examples of the disclosure.

FIG. 11A illustrates a device 1102 which can represent a single computing device of a distributed computing system. In one or more examples, device 1102 can include an analytics cell 1104. Analytics cell 1104 can include the software and algorithms required to implement the debugging of a stream of data as described above. In one or more examples, analytics cell 1104 can include an input 1110 that receives the streaming data to be transmitted to another computing device. The analytics cell can also include an input 1106 that can be configured to receive watch points from a central processor, thereby providing the analytics cell with the predefined patterns to search for when performing debugging analysis on a stream. In one or more examples, analytics cell 1104 can include an output 1108 that can be configured to output matching patterns for use by either the user (in the form of an alert) and/or can be used by a central processor for further processing.

Figure 11B:
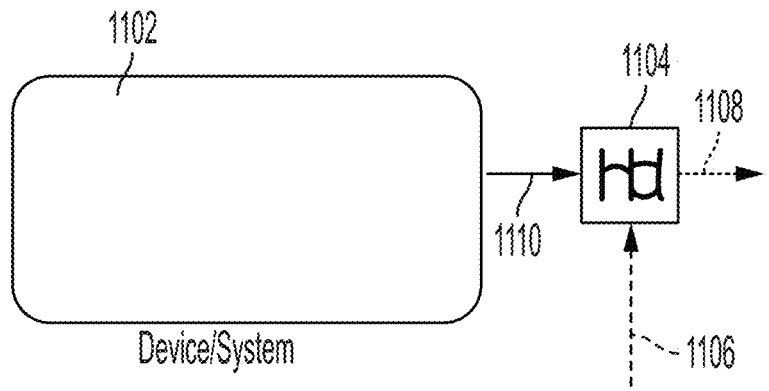

FIG. 11B illustrates an exemplary analytic cell 1104 which can be implemented externally from a device 1102. In one or more examples, the data from the device 1102 can be transmitted externally by the device 1102 to the analytics cell 1104 at input 1110. In this way, rather than occupying memory and the processing capabilities of device 1102, the analytics cell can be implemented externally from the device 1102, thereby utilizing less resources of the device 1102.

Figure 11C:
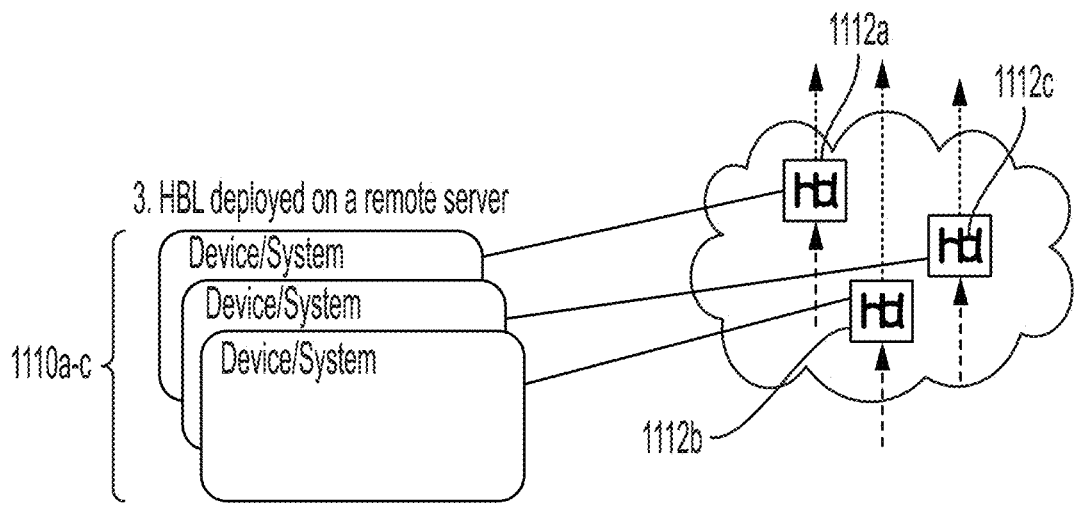

FIG. 11C illustrates an exemplary system in which each analytics engine 1112a-c can be implemented and deployed in a single remote server or cloud computing instance, and each device 1110a-c can transmit the streaming data to the single remote server.

Figure 11D:
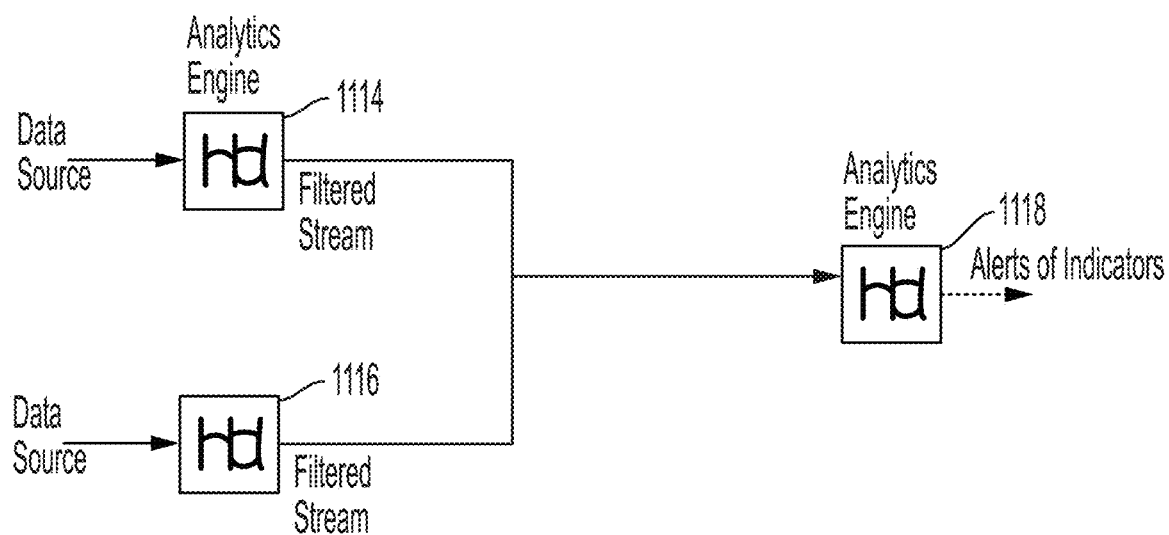

FIG. 11D illustrates an exemplary interconnection scheme that can be implemented internally or externally to a device. In one or more examples, stream filtering can be used to collect the relevant data (i.e., parts of stream that match a specified watch point) from an event stream. It can also be used to combine an event stream data with another event stream data. For example, analytic cell 1114 can detect relevant data from a first stream, while analytic cell 1116 can detect relevant data from a second stream. Any of these streams of data may be a filtered stream of events derived from the raw stream. Any data found to be matching be either analytic cell 1114 and 1116 can then be transmitted to a third analytic cell 1118 which can analyze the combined stream to further detect any patterns in the data specified by a user watch point. An example of using such stream filtering is to identify concurrently occurring events in two separate source streams. Combining streams can require that the separate data sources use clocks whose timing is comparable: either because they have known drift or skew and jitter, or have been synchronized.

Figure 11E:
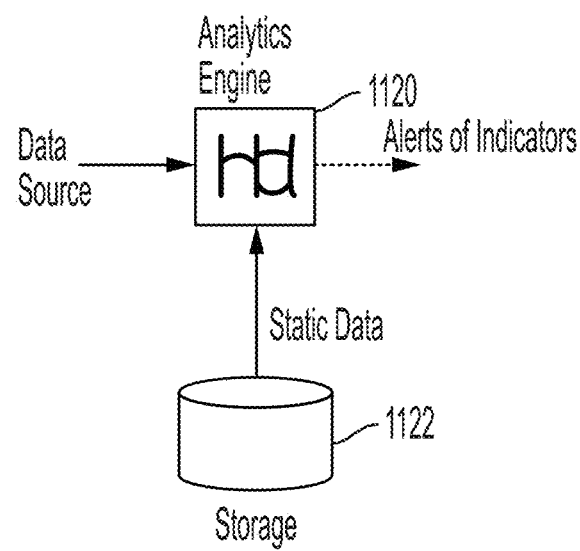

FIG. 11E illustrates an exemplary analytic cell implementation that utilizes "data fusion" according to examples of the disclosure. In the example of FIG. 11E, the analytic cell 1120 can combine the streaming data with static data stored in a data store 1122 so as to provide the user with more information about any alerts generated by the analytic cell 1120. For example, in a navigation context, the data store 1122 can include data about the latitude and longitude of the device, which can be "fused" with any streaming data so that if an alert is generated, then user can be made aware of the location of the device when the alert was generated.

Figure 11F:
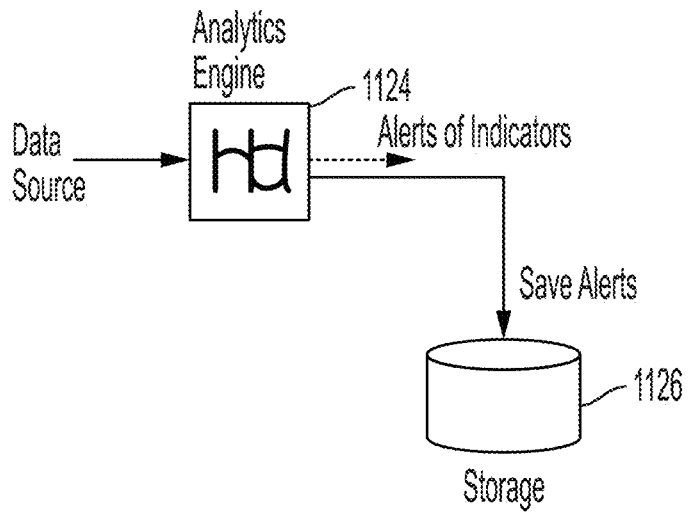

FIG. 11F illustrates an exemplary analytic cell implementation in which alerts generated by an analytic cell can be stored in a persistent data store. In one or more examples, the example of FIG. 11F can include an analytic cell 1124 that can generate alerts which in one or more examples can store the alerts in a data store 1126. In one or more examples, the data stored in data store 1126 can be stored as a log file that can be accessed later on and even replayed. The system of FIG. 11F can allow for generated alerts to be processed later by the system and may be useful in contexts where the computing device which pertains to the analytic cell 1124 may be disconnected from a central processor or other computing device.

Figure 11G:
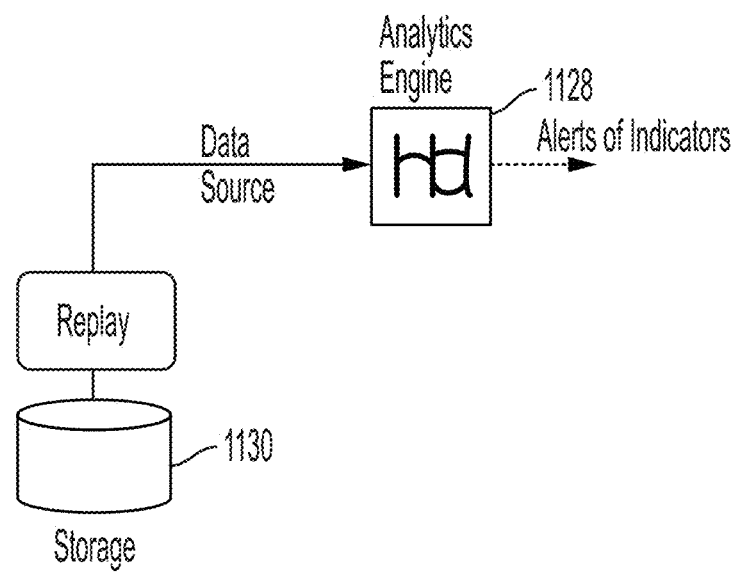

FIG. 11G illustrates an exemplary analytic cell in which the input stream can be stored in a data store and replayed to the analytic cell according to examples of the disclosure. In one or more examples, rather than processing streaming data, the analytic cell 1128 can process data stored in a data store 1130. The data stored in data store 1130 can be "replayed" at a later time to the analytic cell 1128. In one or more examples, the data stored in data store 1130 can be saved in the same format as when the data was transmitted, and may not be required to be converted into a log file.

Figure 11H:
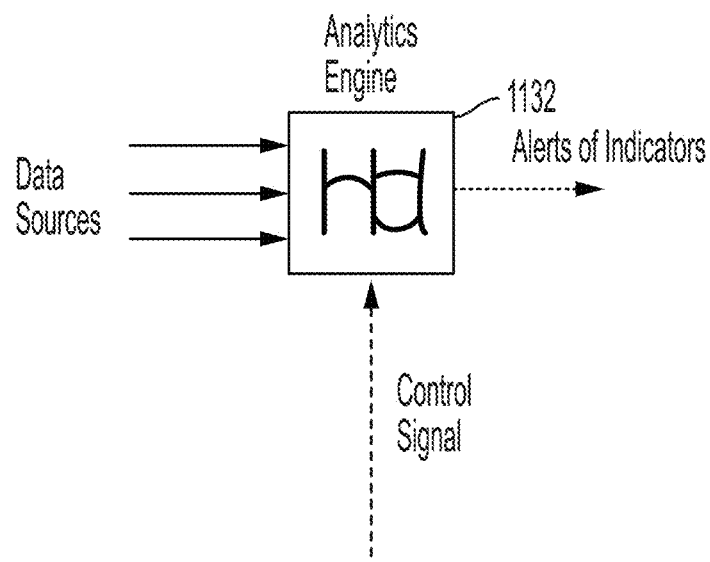
Figure 11I:
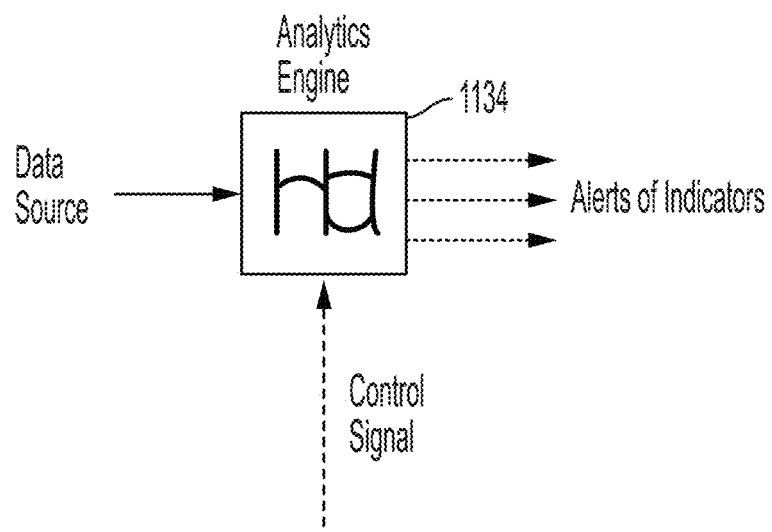

FIGS. 11H and 11I illustrates various input and output examples of an analytics cell according to examples of the disclosure. In the example of FIG. 11H, the analytic cell 1132 can receive streaming data from a plurality of data sources and can generate a single alert if any of the received streams match a pattern specified by a predefined watch point. In the example of 11I, the analytic cell 1134 can receive data from a single stream, but can generate a plurality of alerts that can be transmitted to various devices and processors in the distributed system, as well as one or more users.

Figure 11J:
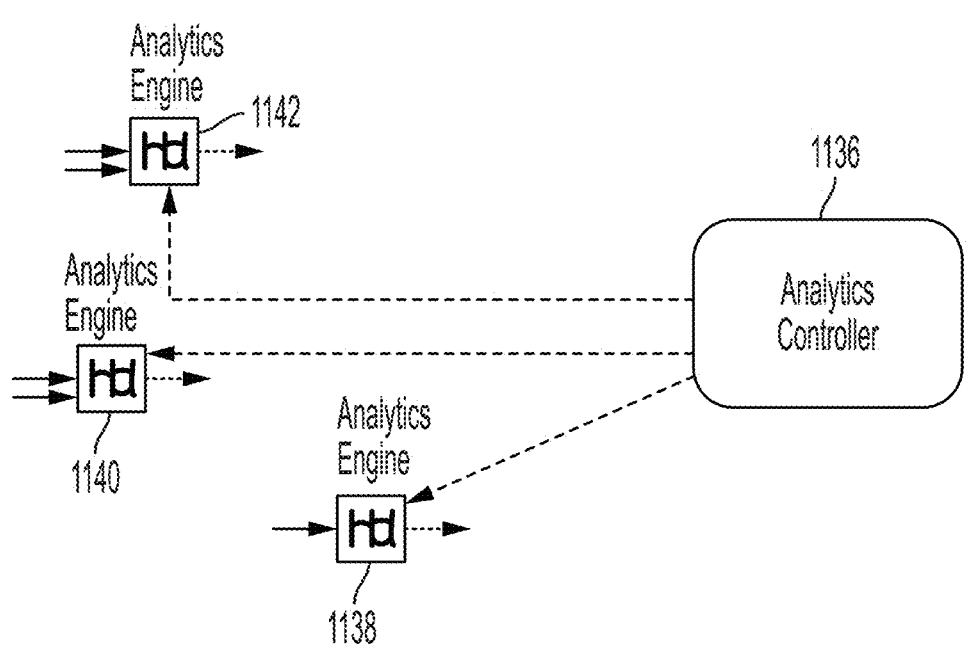

FIG. 11J illustrates an exemplary system for coordinating analytic cells distributed across a plurality of computing devices according to examples of the disclosure. In one or more examples, analytics controller 1136 can be connected to a plurality of analytic cells 1138, 1140, and 1142 so as to control each of the cells. In one or more examples, the analytics controller 1136 can receive information from each of the analytic cells 1138, 1140, and 1142 so as to display outputs from each cell, and can also provide watch points to each of the analytic cells as described above. In one or more examples, analytic cells 1138, 1140, and 1142 can be implemented in any of the manners described above. In one or more examples, the output of any one of analytics engine 1138, 1140, and 1142 can be connected to the input of any one of analytics engine 1138, 1140, and 1142 so as to create a complex network of analytic cells that can be collectively configured to detect patterns of data being transmitted across a distributed computing system.

Recognizing and identifying patterns in data being transmitted and received across a distributed computing system can have many uses. In one or more examples, and as described in detail above, the "watch points" and the methods and systems for specifying and detecting them can be utilized in the context of replay debugging and graphical visualizations of the operations of a distributed systems, however as described in detail below, the "watch points" and watch point detectors can be used in other contexts and for other purposes In the context of cyber-physical systems, in which distributed computing systems are used to operate the sensors and actuators used to operate a physical system (such as the system described above with respect to FIG. 2), detecting certain conditions and patterns in transmitted data can allow for realistic simulations or tests of attacks on the system. In one or more examples, watch points can be used to define the exact conditions at which an effect is applied, as described is further detail below. Thus, the watch points, rather than simply alerting the user to the occurrence of certain patterns within the data transmitted in a distributed system, can be used to provide realistic testing to a cyber-physical system, in a manner that can closely mimic how a real-world attack on a cyber-physical system would be implemented.

In one or more examples, the testing can be implemented as injecting "effects" into the system under the test (such as a cyber-physical system). Effects can be configured to mimic the methods and tactics that a malicious user would use to manipulate the system. In one or more examples, injecting effects can include invoking a function or procedure that can change the internal parameters of a cyber-physical system. Additionally, in one or more examples, injecting effects can also include manipulating one or more input data streams into a system over time. As described above, injecting effects can be done at appropriate times and in response to appropriate conditions during the operation of a system, and thus the process of injecting effects can include identifying when those times and conditions are occurring.

Figure 12:
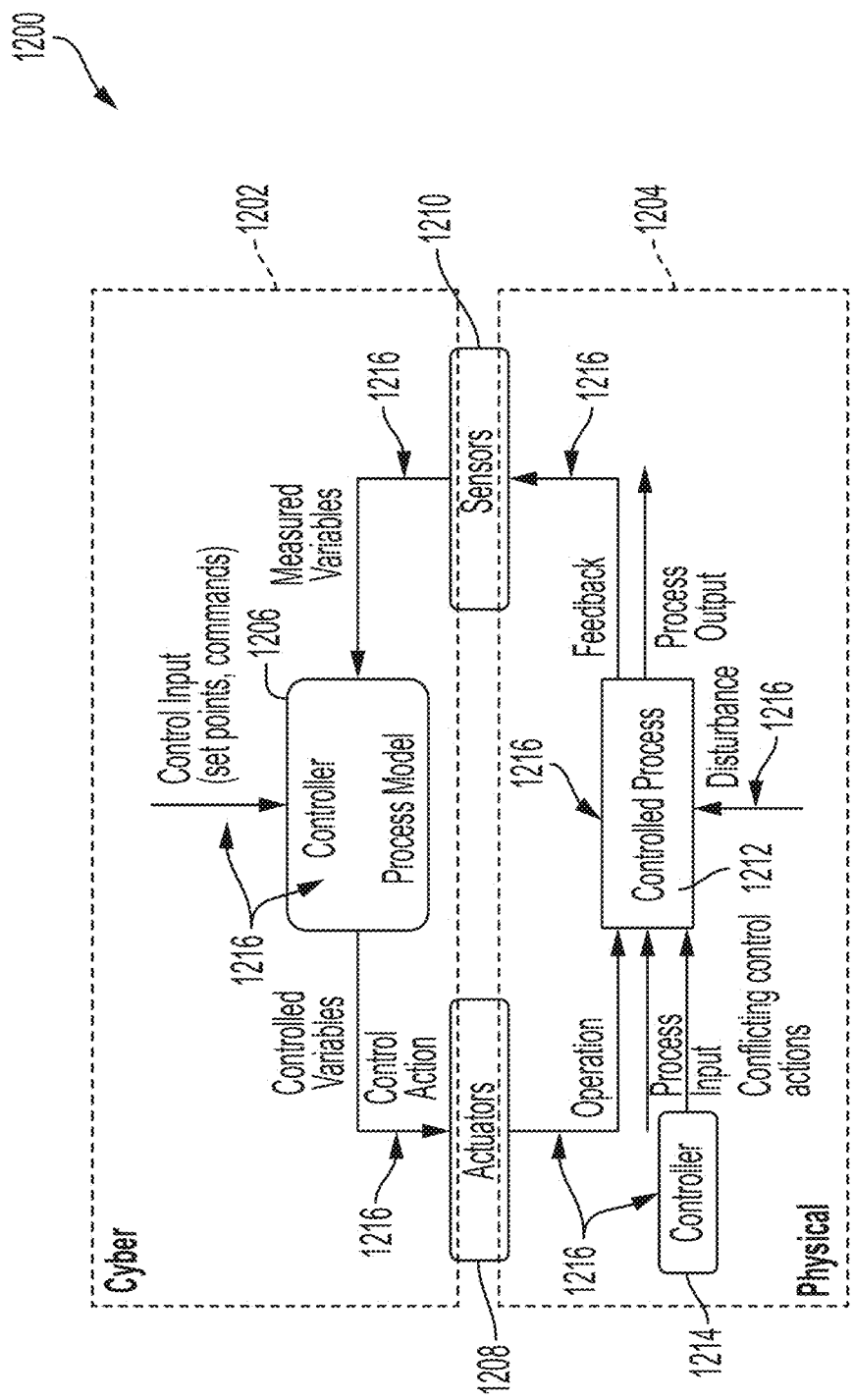
FIG. 12 illustrates an exemplary cyber physical system according to examples of the disclosure.

FIG. 12 illustrates an exemplary cyber physical system according to examples of the disclosure. In one or more examples, the cyber-physical system 1200 can include one or more components 1202 that represent the "cyber" elements of the cyber-physical system 1200. The cyber components 1202 can represent the components in the cyber physical system that operate the distributed software system that is used to operate the system. Specifically, and in the example of FIG. 12, the cyber components can include a controller 1206 that is used control one or more actuators 1208, and one or more sensors 1210. The controller 1206 can receive input regarding the conditions of the system 1200 from the one or more sensors 1210, and can use that information to control the one or more processors 1208 that control the physical elements of the system.

In one or more or more examples, the cyber-physical system 1200 can include one or more "physical" components 1204. The one or more physical components 1204 are the components that execute the physical elements in the system. In one or more examples, the one or more physical components 1204 can include a controlled process 1212 that executes one or more physical processes based on operation of the actuators 1208 and can provide feedback to the sensors 1210. In one or more examples, the one or more physical components 1204 can include an additional controller 1214 that can be used to issue conflicting commands to the controlled process 1212. The controller 1214 can be operated by a malicious user to issue the conflicting commands. In one or more examples, the actuators 1208 and the 1210 can be considered as belonging to both the cyber components 1202 and the physical components, as they represent the interface between the cyber components 1202 and the physical components 1204.

As illustrated in FIG. 12, the components of the cyber-physical system 1200 can communicate with one another so as to operate the system. For example, in one or more examples, the controller 1206 can receive control inputs (i.e., set points or commands) from an external user. The control inputs can be used by the system 1200 to operate the system according to a user's specifications. In one or more examples, the controller 1206 can receive data about the system 1200 from the one or more sensors 1210 (labeled in the figure as measured variables). Based on the data received from the one or more sensors 1210, the controller 1206 can issue on or more commands (i.e., control actions) to the one or more actuators 1208 which in turn can operate the physical components of the cyber physical system.

In one or more examples, the actuators can communicate (by transmitting and receiving data) with the controlled process to provide instructions on the operation of the physical system. Likewise, the controller 1214 can also issue the conflicting commands to the controlled process 1216. In one or more examples, the controlled process can communicate with the sensors 1216 to provide feedback about the operation of the system. The controlled process 1212 can also produce the process output as illustrated in the example of FIG. 12.

Each of the communication paths described above can be vulnerable to attack from a malicious user. By manipulating the contents of the communications between the various components, a malicious user can successfully cause unintended operation of the system 1200, and can do so while evading detection by the authentic user of the system. Attack vectors 1216 show the many avenues of communication that can be manipulated to attack a cyber-physical system. For instance, in one or more examples, a malicious user could manipulate the control inputs to the controller 1206, can manipulate the control actions communicated to the actuators 1208, or could manipulate the data provided by the sensors 1210 to the controller 1216, for example. In order to build a robust cyber physical system, it can thus be important to simulate attacks on the system in an accurate and as true to real-world method. Doing so can allow the user to develop various mitigation strategies based on an accurate representation of how attacks against the cyber-physical system will manifest themselves.

As described above, properly and accurately injecting effects into a cyber-physical system to test various attacks on the system can include ensuring that the effects used to simulate an attack are injected at appropriate times and under the appropriate circumstances. In one or more examples of the disclosure, injecting the effects at appropriate times and or circumstances can mean injecting the effects when the cyber-physical system is operating at a certain state or condition that would present an opportunity to a malicious actor to inject an effect into the system that can operate the system in an unintended manner. In one or more examples, determining a particular state or condition of the device can be achieved by analyzing the communications between the various components of the system during operating of the distributed software system to ascertain when certain conditions occur. Thus, in order to test various attack scenarios, it may not be enough to simply inject an effect into the system, but rather timing the effect for the right moment or the right circumstance can lead to a more robust and accurate test.

Figure 13:
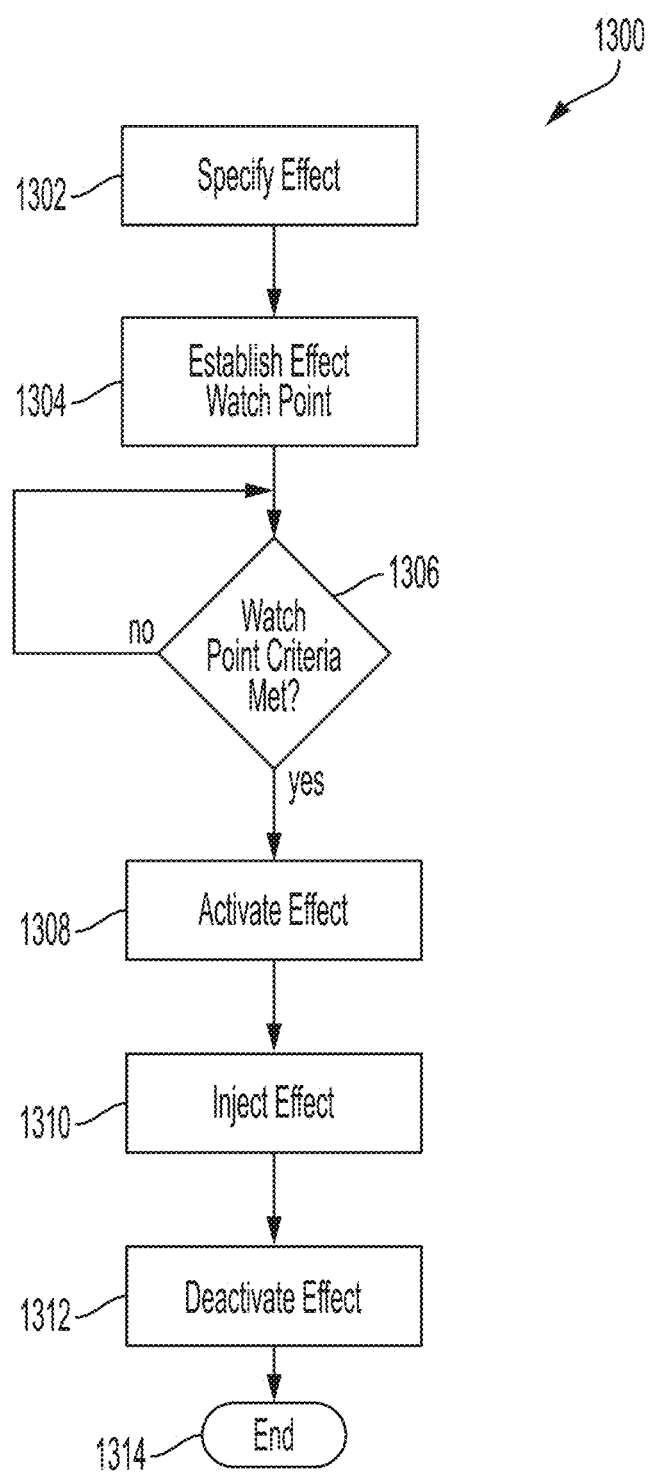
FIG. 13. Illustrates an exemplary process for specifying and injecting effects into a cyber-physical system according to examples of the disclosure.

FIG. 13. illustrates an exemplary process for specifying and injecting effects into a cyber-physical system according to examples of the disclosure. In one or more examples, the process 1300 of FIG. 13 can begin at step 1302 wherein a user specifies an effect to be injected into the system under test. As described in further detail below, in one or more examples, the user can specify the effect using a domain-specific language which can provide a specialized syntax for specifying the effect. In one or more examples, the user when specifying an effect can also use the domain-specific language to specify the conditions upon which the effect will be injected. Once the effect is specified (along with the condition), as will be described in detail below, the system can establish a watch point (using the HBL language) described above that will monitor for the condition by monitoring the communications between the components of the distributed software system as described above.

Once the user has specified the effect using the domain-specific language at step 1302, the process 1300 can move to step 1304 wherein the specification provided the user is used to create one or more watch points. As described above, a watch point can be specified using a domain-specific language such as HBL. As described above with respect to FIGS. 8-11, each component in the cyber-physical system can include an analytic cell that is configured to receive the specification of watch points, and can use that specification to monitor communications transmitted to and from the components to detect when the conditions or patterns specified by the watch point are present. In one or more examples, once a watch point has been established based on the effect specified by the user, that watch point can be transmitted to each and every analytical cell contained within the cyber-physical system, so that the conditions specified by the watch point can be monitored for at each and every node running the distributed software program used to implement the cyber-physical system.

Once the watch point has been established at step 1304, the process 1300 can move to step 1306, wherein the communications between the various nodes of the cyber-physical system can be monitored (using the analytical cells) to determine if the watch point criteria has been met. If it the criteria has not been met, the monitoring can continue until the criterial has been met. In the event that the criteria specified by the watch point has been met, then the process 1300 can move to step 1308 wherein the effect specified by the user at step 1302 can be activated. In one or more examples, and as described in further detail below, activating an effect can include placing an effect to be injected into a buffer for later injection into the stream of data circulating within the distributed software system.

Once the effect has been activated at step 1308, the process 1300 can move to step 1310 wherein the effect can be injected into the data stream of the cyber-physical system. In one or more examples, injecting an effect can include invoking a function or procedure that can change the internal parameters being transmitted between the nodes of the cyber-physical system. In one or more examples, the parameters could be set points that can be set externally, command, or other external parameters, or internal parameters. Additionally, injecting an effect can include change one or more input data that streams into a system over time. In other words, injecting an effect can involve continuously manipulating the data that is passed between nodes of the cyber-physical system over a period of time or throughout operation of the system.

After injecting the effect at step 1310, the process 1300 can move to step 1312 wherein the effect can be deactivated. Deactivating an effect can include terminating the function or procedure used to inject the effect, or ceasing to manipulate the data that is passed between the nodes of the cyber-physical system. In one or more examples, the conditions upon which the effect is to be deactivated can be specified as part of the effect specification process described above with respect to step 1302. Finally, once the effect has been deactivated at step 1312, the process 1300 can move to step 1314 wherein the process is terminated.

The process described above with respect to FIG. 13 can thus provide a way for a user to specify not only the type of event they wish to inject into a cyber-physical system, but also the conditions upon which the effect should be injected. In one or more examples, the conditions that can cause an effect to be injected can be specified using a domain-specific language such as the HBL language described above. The HBL language can allow for the user to specify the patterns or conditions in the data that would trigger (i.e., activate) an effect. The HBL specification of the condition or pattern can be used to generate a watch point (described above) that can then be transmitted to the one or more analytic cells distributed across the nodes of the cyber-physical system so that each node can monitor for the conditions or patterns specified using the HBL language.

In one or more examples, the effects tied to each watch point can also be specified using a domain-specific language, configured to inject conditional effects into a system or device. The domain-specific language to specify effects (referred to herein as the "effects language") can include the effects of injection operators, the syntax of effects injection scripts or programs used to instantiate an effect and inject into the system under test. The effects language can include one or more operators that specify the action to take once a condition specified by the corresponding watch point has occurred.

For instance in one or more examples, the effects language can include syntax relating to one or more actions to be taken (i.e., the effect). For instance, in one or more examples, the effects language can include a log command. The log command can write or print to a log destination the result of an evaluation of a logic expression, or the values of variables, or some specified value. The <log destination ID> is specified as a script. Typically the destination is a file in the file system. If no <log destination ID> is specified, in one or more examples the log command can print to a pre-determined file. The log command can allow for an information about the system to be automatically logged. An example, log command syntax is provided below.

```
log <log-destination ID> <logic expression>
log (<variable >| <value>) (, (<variable >|<value>)*
```

In the above example, the log syntax can include the destination ID for where the log is to be stored, as well as the logical expression to be stored at the specified location. Examples of log expressions are provided below.

```
log n1;
log file-2 n1;
log x>5;
log "success";
```

In one or more examples, the effects language syntax can include a modify syntax that can be used to instruct the system to take an event (i.e., a communication) that has arrived a particular node of the cyber-physical system and modify it in some way. An example modify command syntax is provided below.

Modify (<attr1>=<val1>,<attr2>=<val2>, . . . )

As described above the modify command when executed, copies and modifies the current event with changes to any of its attributes and releases the modified event to the system. In one or more examples, the effects language syntax can include a drop syntax that can be used to instruct the system to take an event (i.e., a communication) that has arrived at a particular node of the cyber-physical system and drop it so that the event in not communicated to the next node in the cyber-physical system. An example drop command syntax is provided below.

Drop [<index>]

The index operator in the drop command can inform the system which event in a buffer (described in further detail below) to drop. In one or more examples, the effects language syntax can include a delay syntax that can be used to instruct the system to delay an event (i.e., a communication) that has arrived a particular node of the cyber-physical system before it is passed to the next node in the system. An example delay command syntax is provided below.

Delay <duration>|<index>

The duration field can specify the amount of time to delay the event, while the index field can specify which event in the buffer to delay. The above syntaxes are meant as examples only and are not meant to be an exhaustive list of all the possible effects that can be injected into the system. In one or more examples, the effects language can allow for the specification of other effects such as: (1) a store operator that directs the system to store a copy of the current event or past event; (2) a release operator that can direct the system to release a stored event into a system; (3) a replay operator that can insert copies of a stored event into a system; and (4) a create operator that directs the system to create a raw event using information from existing event types, and store the events in memory for later use. The above list is meant as an example of different types of operators that can be included in a domain-specific language protocol and should not be seen as limiting.

As demonstrated above, an effects language can allow for the specification of effects using a domain-specific language with a syntax that is specifically configured to allow the user to specify not only the type of effect, but also the conditions required to be present in the system, for the effect to be injected into the system.

As described above with respect to FIG. 13, the process of injecting an effect into a system can include two distinct steps: (1) identifying the condition in the streaming data to activate the effect and (2) injecting the effect into the stream of data flowing through the system under test. Performing these steps sequentially can add latency to the data flow through a distributed software system. For example, as the data flows through the system, the detection of a watch point condition may not occur at the speed of data flow, and thus the data may have already flowed through a component of the cyber-physical system by the time a watch point condition has been recognized by the analytical cell. Thus, in one or more examples, the event data stream flowing through a component may need to be buffered (i.e., temporarily stored) to allow for the detection of a watch point, and to allow for the event/data to be manipulated according to the effect specified using the effects language described above.

Figure 14:
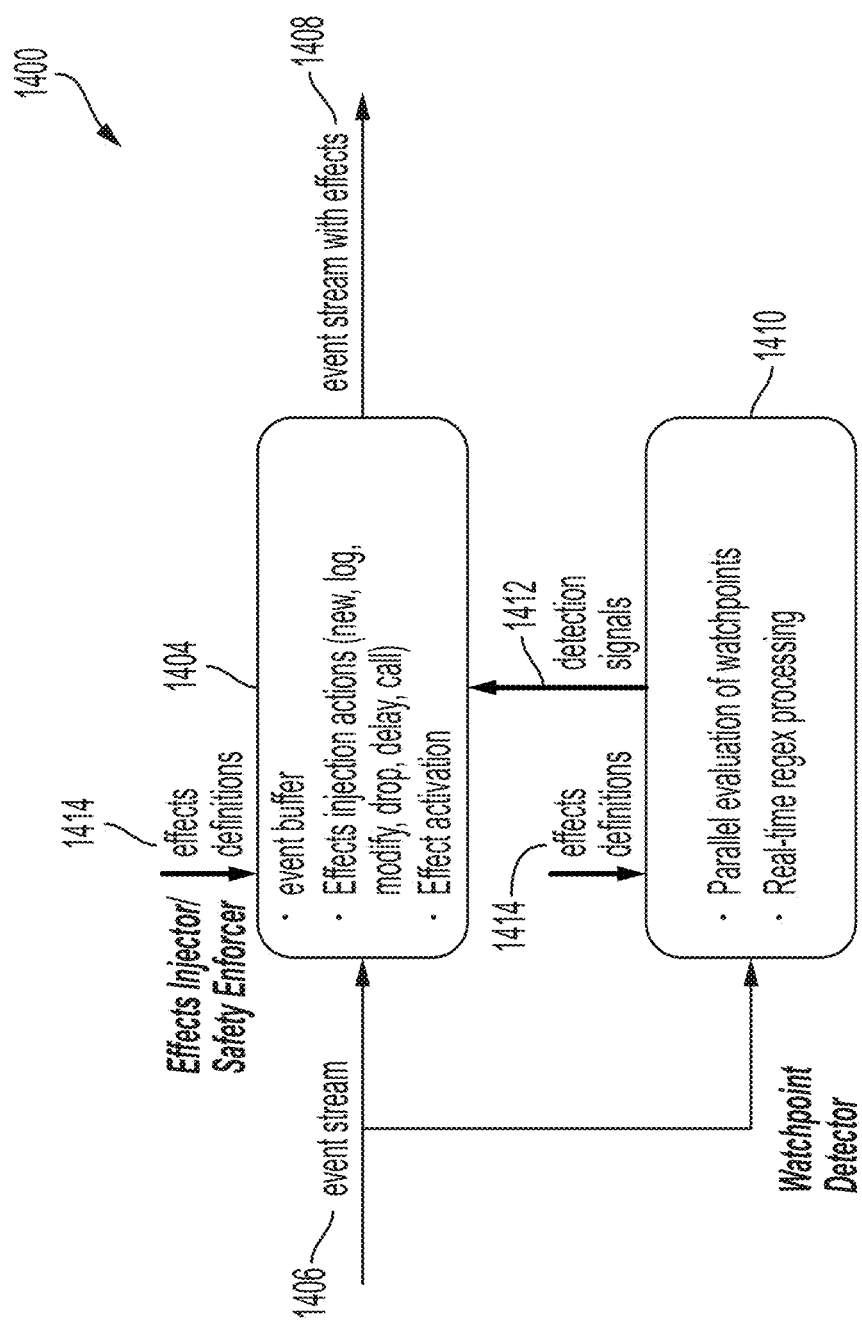
FIG. 14 illustrates an exemplary system for specifying and injecting effects into a cyber-physical system according to examples of the disclosure.

FIG. 14 illustrates an exemplary system for specifying injecting effects into a cyber-physical system according to examples of the disclosure. The system 1400 of FIG. 14 can illustrate a system that is configured to simultaneously buffer an event stream and detect whether the event stream matches one or more watch points. If the event stream matches a watch point, then the system 1400 of FIG. 14 can also can be configured to apply or inject the corresponding effect specified by the user to the buffered event stream, before injecting the modified even stream back into the cyber-physical system data flow. In one or more examples, an effect can include changes in the content of an event stream, or a function call or an invocation of an Application Program Interface (API) of a system component or an external system, resulting in a change in the system component or external system.

In one or more examples, the system 1400 can receive an event stream 1406 at two separate components, an event buffer 1404, and a watch point detector 1410. In one or more examples, each of the event buffer 1404 and the watch point detector 1410 can receive one or more effect definitions 1414, which can represent the specification of an effect in the effects language described above. The watch point detector can accept the effects definition 1414 and use the effects definition to create one or more watch points that when detected can be used to trigger an event. In one or more example, the event buffer 1404 can accept the effects definition 1414 to create one or more effects at the appropriate moment as described below.

In one or more examples, when an event stream flows into the system 1400 it can be simultaneously received at both the event buffer 1404 as well as the watch point detector 1410. The event buffer 1404 can temporarily store the event (and other prior events) in a temporary storage inside the event buffer 1404. The watch point detector 1410 can receive the event stream 1406 and analyze the incoming events to determine whether they implicate the one or more watch points specified by the effects definition 1414. In one or more examples, an event or series of events streamed into the watch point detector 1410 are found to match one of the more watch points specified by the effects definition 1414; the watch point detector 1410 can transmit one or more detection signals 1412 to the event buffer 1404.

Upon receiving the detection signals 1412 from the watch point detector 1410, the effects buffer 1404 can activate the one or more events specified by the effects definition 1414 as described above. In one or more examples, the event buffer 1404 (as part of activating the event) can manipulate the contents of the buffer (described in further detail below) according to the effect definition 1414. Once the contents of the event buffer have been modified according to the effect definition 1414, the event buffer can output the contents of the buffer as shown at 1408, so as to "inject" the event into the cyber-physical system event stream.

Figure 15:
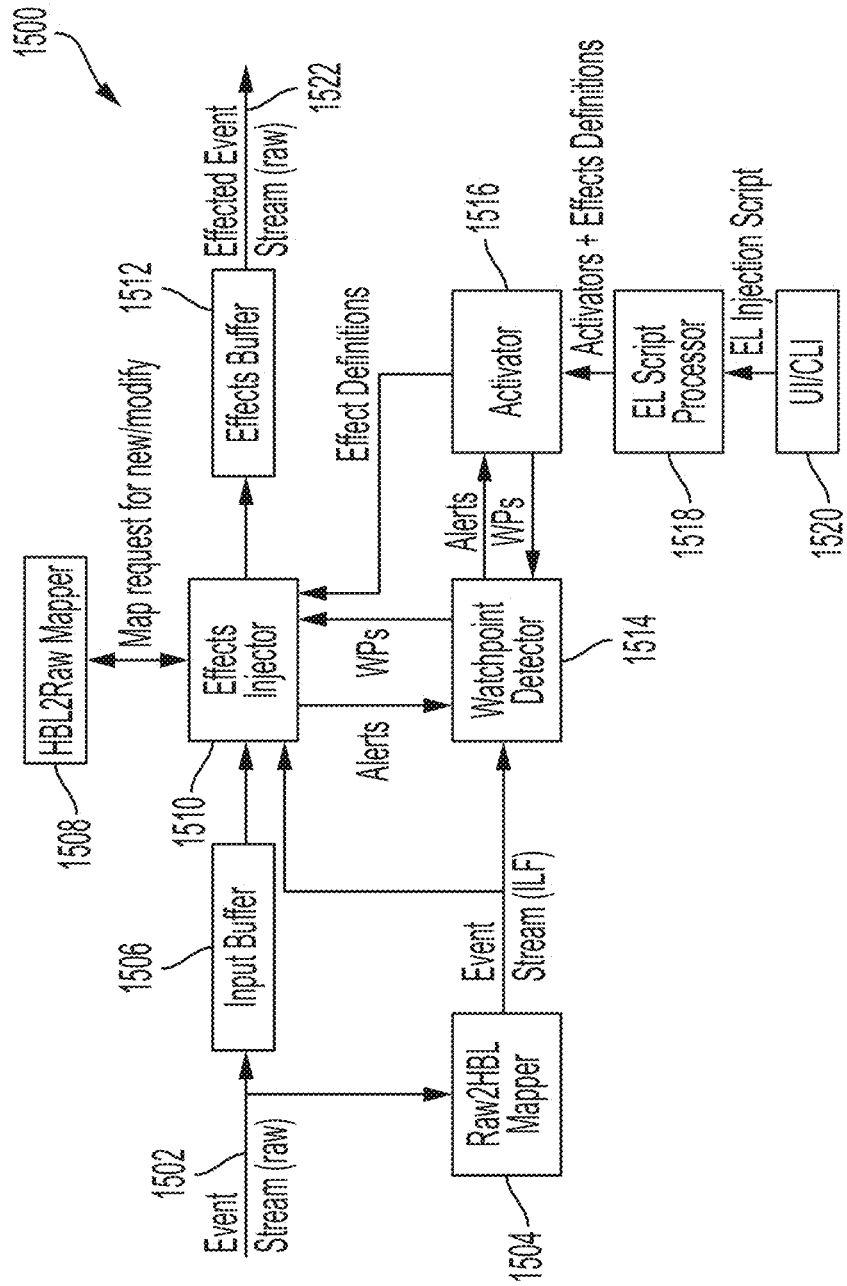
FIG. 15 illustrates an exemplary system that includes an effects injector according to examples of the disclosure.

FIG. 15 illustrates an exemplary system that includes an effects injector according to examples of the disclosure. The example system of FIG. 15 can show how the system described above with respect to FIG. 14 can be part of a larger system designed to program and implement effects into a cyber-physical system. In one or more examples, the system 1500 can include a user interface 1520 that can allow the user to specify one or more effects using the effects language described above. In one or more examples, the user interface 1520 can be communicatively coupled to an effects language script processor 1518 that can be configured to receive the effects language specification provided by the user at the user interface 1520. In one or more examples, upon receiving the effects language specification from the user, the effects language processor 1518 can parse the received specification to determine the desired effect to be injected into the system as well as the corresponding watch points corresponding to the effect as defined by the user.

In one or more examples of the disclosure, after determining the effects and watch points, the effects language script processor can transmit the determined watch points and effects to an activator 1516. In one or more examples, the activator 1516 can be coordinate the actions between a watch point detector 1514 and an effects injector 1510. In one or more examples, the activator 1516 can receive the determined effect definition and watch points from the script processor 1518, and then transmit them to the effect injector 1510 and watch point detector 1514 respectively.

In one or more examples, the system 1500 can input an event stream 1502, and output an effected event stream (that includes the injected event) at 1522. In one or more examples, the event stream 1502 can be placed into an input buffer 1506 that can temporarily store the event stream 1502 as described above with respect to FIG. 14. Simultaneously, the event stream 1502 can be fed into a HBL mapper unit 1504 that is configured to convert the raw event stream into the ILF format so as to determine if the incoming stream matches one or more watch points. Thus, the output of HBL mapper unit 1504 is an ILF representation of the input event stream 1502. The ILF event stream can be transmitted to the watch point detector 1514, and the watch point detector 1514 can analyze the ILF event stream to determine if the event stream matches one or more watch points stored in the watch point detector 1514.

If a received ILF event stream matches one or more watch points at the watch point detector 1514, then the watch point detector 1514 can transmit a signal to the effects injector 1510 so as to activate the effect corresponding to the watch point. In one or more examples, the effects injector 1510 in response to an alert from the watch point detector 1514 can modify the contents of the input buffer 1506 according to the effect specified by the user at user interface 1520, and then output the modified contents of the buffer to an effects buffer 1512. The contents of the effects buffer 1512 can then be output to the stream of the cyber-physical as shown at 1522. In one or more examples, the system 1500 can include an HBL to Raw Mapper 1508 that can be configured to convert HBL expressions into raw data, that can then be used by the effects injector 1510 to recreate the events specified by the user.

As described above, an effects injector can pull events/data from an input buffer, manipulate the data according to the specified effect to be injected, and then output the injected effect to an effects buffer to be outputted as the event stream thereby "injecting" the effect into the stream of data flowing between the one or more components of a cyber-physical system. The effect injector 1510 of FIG. 15 can thus work have access to and can read/write from both input buffer 1506 and the effects buffer 1512 in order to create and inject the effect into the cyber-physical system.

Figure 16:
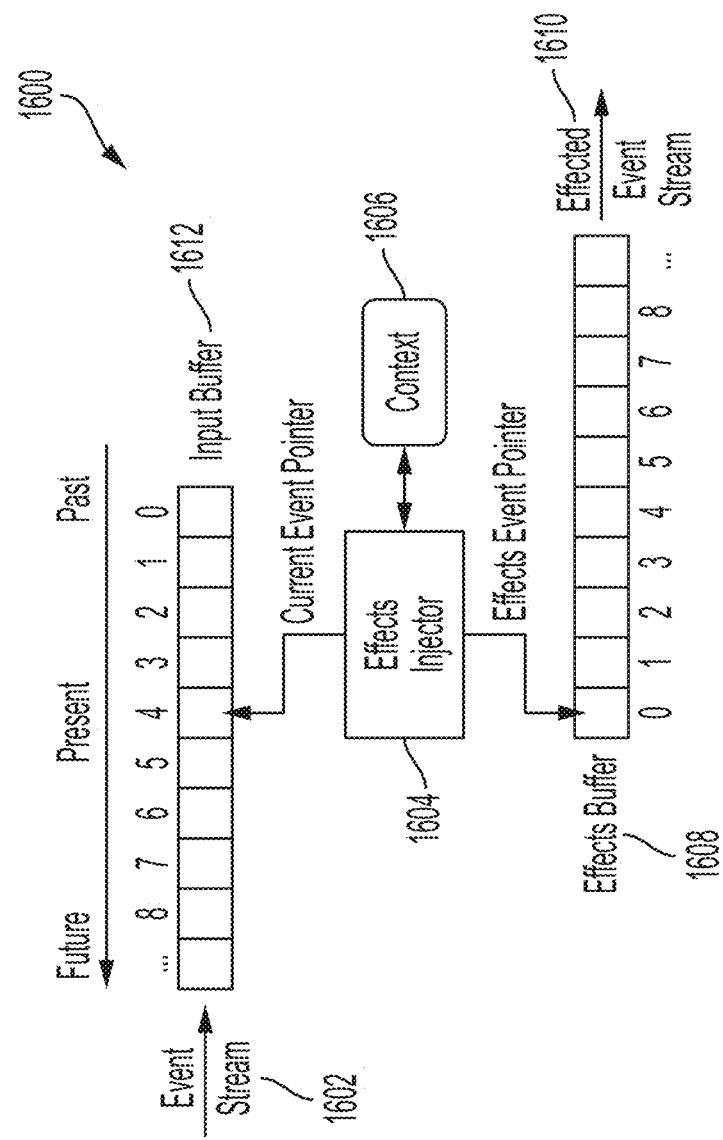
FIG. 16 illustrates an exemplary interface between an effects injector, an input buffer, and an effects buffer according to examples of the disclosure.

FIG. 16 illustrates an exemplary interface between an effects injector, an input buffer, and an effects buffer according to examples of the disclosure. In one or more examples, and as illustrated in the example 1600 of FIG. 16, the incoming events 1602 can be pushed into the Input Buffer (IB) queue 1612, and the outgoing effected events can be stored in the Effects Buffer (EB) 1608. In one or more examples, the IB 1612 can be read-only, while the EB 1608 can be write-only. In one or more examples, the size of IB 1612 can be finite, and can be implemented as a circular buffer. In one or more examples, the event stream 1602 can include a raw event stream, and a corresponding HBL ILF event stream. The context 1606 can be configured to maintain the variables.

In one or more examples, every event in the IB 1612 can have a mandatory "time-to-stay" in the IB 1612, which means it must be in IB 1612 at least for the duration of the "time-to-stay" before it is processed by effects injector (EI) 1604 and removed from IB. In one or more examples, the "time-to-stay" parameter can be of sufficient duration to make sure that EI 1604 can allow enough time for watch point detection to succeed. In one or more examples, the value of "time-to-stay" is configurable in the injection script specified by the user. In one or more examples, the default value and max value may be set in the absence of a specified value in the injection script. This value may be changed in the injection script any number of times, and the EI 1604 will attempt to respect this change as best as it can with no guarantees. The effected event stream 1610 can take the form of a raw event stream. In one or more examples, the EI 1604 can be configured to perform the necessary mapping required from the HBL ILF to raw event as necessary to support some injection operators.

In one or more examples, the effects language can be configured to allow for effects to be "chained." In one or more examples, the "chain" effect can define a sequence of effects with an activation watch point that specifies the triggering condition for activating each effect. In one or more examples, when an effect in the chain is activated using the activation watch point, and the watch point for the effect is triggered, the specified effect can be applied. Once the effect starts executing, the effect can automatically be deactivated, and the next effect can be activated, and so on. In one or more examples, a chain effect can be activated with an activation command.

Figure 17:
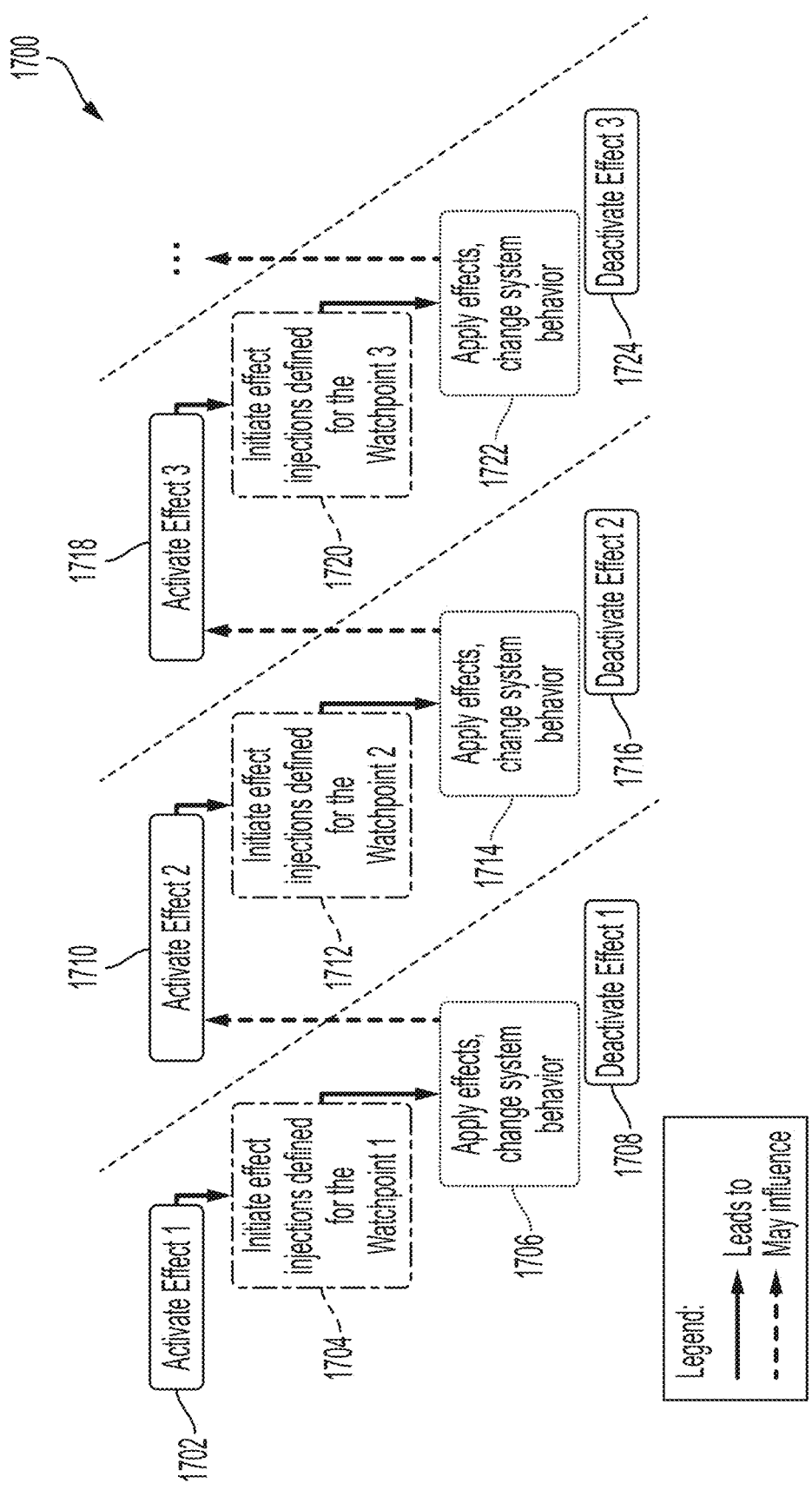
FIG. 17 illustrates an exemplary process for chaining effects that utilizes an effects injector according to examples of the disclosure.

FIG. 17 illustrates an exemplary process for chaining effects that utilizes an effects injector according to examples of the disclosure. In one or more examples of the disclosure, the process 1700 illustrated in FIG. 17 can begin at step 1702 wherein a first effect is activated due to the detection of a condition corresponding to the watch point for the effect. In one or more examples, after activating the effect, the process 1700 can move to step 1704 wherein the first effect can be initiated. Once the first effect has been initiated at step 1704, the process 1700 can move to step 1706, wherein the effect can be applied to the data stream. Finally, once the effect has been applied at step 1706, the process 1700 can move to step 1708 wherein the first effect is deactivated.

In order to create the "chain" effect, at step 1706, applying the effect can also include initiating the process to activate a second effect. Thus, after the first effect is deactivated at step 1708, the second effect can be activated at step 1710. The process can then repeat itself for the second effect. Thus, after the second effect has been activated at step 1710, the process 1700 can move to step 1712 wherein the second effect can be initiated. Once the second effect has been initiated at step 1712, the process 1700 can move to step 1714 wherein the second effect is applied. Finally, after the second effect is applied at step 1714, the process 1700 can move to step 1716 wherein the second effect can be deactivated.

Similar to the example described above with respect to step 1706, at step 1714, applying the second effect can also include causing the activation of the third effect at step 1718. After the third effect has been activated at step 1718, the process 1700 can move to step 1720 wherein the third effect can be initiated. Once the third effect has been initiated at step 1720, the process 1700 can move to step 1722 wherein the third effect is applied. Finally, after the third effect is applied at step 1722, the process 1700 can move to step 1724 wherein the third effect can be deactivated. Thus, as illustrated in the example of FIG. 17, the effects language can be configured to allow for the user to specify "chained" effects that can be activated and deactivated in succession with one another.

Figure 18:
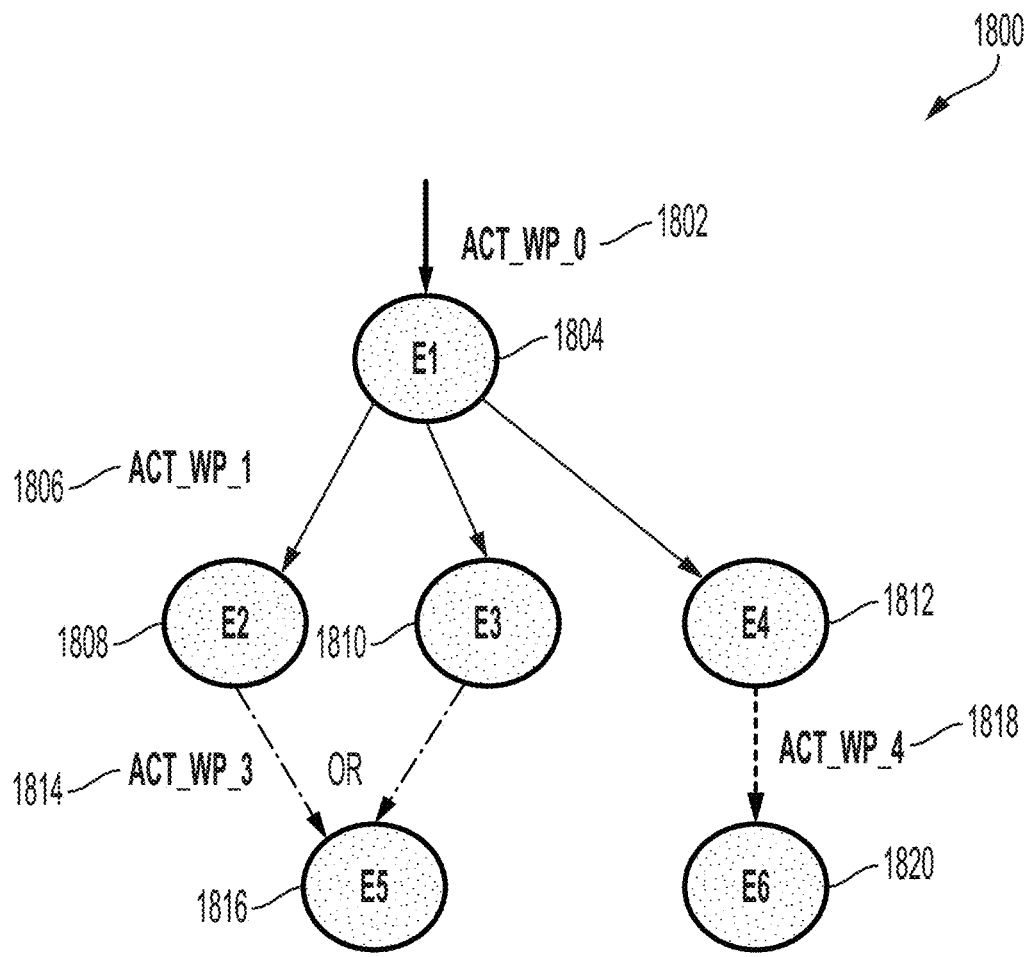
FIG. 18 illustrates an exemplary chained effect graph according to examples of the disclosure.

FIG. 18 illustrates an exemplary chained effect graph according to examples of the disclosure. The example graph 1800 of FIG. 18 can help to illustrate the chained effect paradigm explained above with respect to FIG. 17. In one or more examples of the disclosure, a user can specify a plurality of effects E1-E6 (labeled in the figure as 1804, 1808, 1810, 1812, 1816, and 1820 respectively).

Using the effects injection language described in one or more examples, the user can specify that effect E1 1804 is to be triggered upon the watch point "ACT-WP_0" 1802. Also using the effects injection language described above, the user can specify a series of "chained effects" that can be configured to occur after effect E1 1804 is triggered. For instance, and as illustrated in graph 1800, the user can specify that causing E1 1804 to occur can trigger a watch point 1806 to activate effects E2, E3, and E4 (1808, 1810, 1812). In this way, the injection of E1 1804 can cause a chain effect that causes E2, E3, and E4 to activate and be injected into the distributed software system at the same point in the stream or even at different points in the stream.

In one or more examples, and as illustrated in graph 1800, the injection of E2 or E3 can itself trigger a watch point condition 1814 that can be configured to activate an additional effect E5 1816. As shown in the example graph 1800 of FIG. 18, effect E5 1816 can be triggered when either effect E2 1808 OR E3 1810 is activated. In one or more examples, and using the effects injector language described above, the user could alternatively specify the chained effects such that effect E5 1816 is triggered when both E2 1808 AND E3 1810 is injected. Thus, in this alternative example, the user can specify chained effects based on different combinations of prior effects using OR or AND logic. Finally, as shown in graph 1800, the injection of effect E4 1812 can trigger a watch point 1818 which, as specified by the user using the effects injection language, can activate effect E6 1820.

Figure 19:
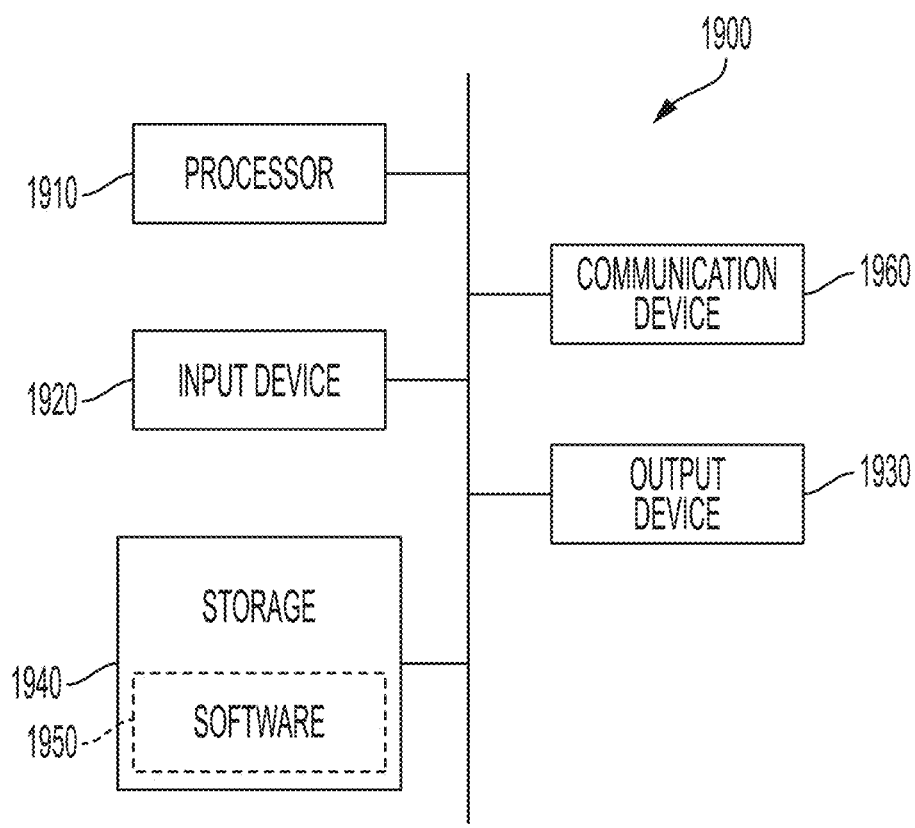
FIG. 19 illustrates an example of a computing device in accordance with one embodiment.

FIG. 19 illustrates an example of a computing device in accordance with one embodiment. Device 1900 can be a host computer connected to a network. Device 1900 can be a client computer or a server. As shown in FIG. 19, device 1900 can be any suitable type of microprocessor-based device, such as a personal computer, workstation, server, or handheld computing device (portable electronic device) such as a phone or tablet. The device can include, for example, one or more of processor 1910, input device 1920, output device 1930, storage 1940, and communication device 1960. Input device 1920 and output device 1930 can generally correspond to those described above and can either be connectable or integrated with the computer.

Input device 1920 can be any suitable device that provides input, such as a touch screen, keyboard or keypad, mouse, or voice-recognition device. Output device 1930 can be any suitable device that provides output, such as a touch screen, haptics device, or speaker.

Storage 1940 can be any suitable device that provides storage, such as an electrical, magnetic, or optical memory, including a RAM, cache, hard drive, or removable storage disk. Communication device 1960 can include any suitable device capable of transmitting and receiving signals over a network, such as a network interface chip or device. The components of the computer can be connected in any suitable manner, such as via a physical bus or wirelessly.

Software 1950, which can be stored in storage 1940 and executed by processor 1910, can include, for example, the programming that embodies the functionality of the present disclosure (e.g., as embodied in the devices as described above).

Software 1950 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1940, that can contain or store programming for use by or in connection with an instruction execution system, apparatus, or device.

Software 1950 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1900 can implement any operating system suitable for operating on the network. Software 1950 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

According to an aspect, a method comprises receiving a specification of an effect to be injected into data transmitted between a plurality of components in a distributed computing system, the specification comprising one or more effects to be injected into the received data and one or more conditions during which the effect is to be injected into the received data, converting the one or more conditions into one or more watch points, wherein each watch point defines a pattern to be searched for in the data transmitted between the plurality of components, receiving data transmitted between the plurality of components in a distributed computing system, determining the presence of one or more patterns within the received data based on the one or more watch points, and if the one or more patterns within the received data are determined to be present: modifying the received data based on the specified one or more effects to be injected into the received data, and transmitting the modified received data to a component of the plurality of components in the distributed computing system.

Optionally, receiving the data comprises storing the data in a first temporary memory storage, and wherein modifying the received data based on the specified one or more effects to be injected comprises extracting the data stored in the first temporary memory storage, modifying the extracted data based on the specified one or more effects to be injected into the received data, and storing the modified extracted data in a second temporary memory storage.

Optionally, transmitting the modified received data to a component of the plurality of components in the distributed computing system comprises transmitting the modified extracted data from the second temporary memory storage to the component of the plurality of components in the distributed computing system.

Optionally, a storage size of the first temporary memory storage is based on an amount of time associated with determining the presence of one or more patterns within the received data based on the one or more watch points.

Optionally, the specification of an effect to be injected into the received data is generated by a user using a domain-specific programming language configured to allow the user to specify an effect to be injected into the distributed computing system and the one or more conditions during which the effect is to be injected into the received data.

Optionally, the domain-specific programming language comprises a modify syntax configured to allow the user to modify the received data.

Optionally, the domain-specific programming language comprises a delay syntax configured to delay the received data.

Optionally, converting the one or more conditions into one or more watch points comprises converting the one or more conditions into one or more regular expressions.

Optionally, determining the presence of one or more patterns within the received one or more data transmissions based on the one or more watch points comprises determining if the received one or more data transmissions partially matches a pattern identified by the one or more regular expressions.

Optionally, determining if the one or more data transmissions partially matches a pattern identified by the one or more regular expressions includes determining if the received one or more data transmissions continues a partially matched pattern found in a previously received data transmission.

Optionally, modifying the received data based on the specified one or more effects to be injected into the received data comprises invoking an Application Program Interface (API) of a component of the plurality of components in the distributed computing system.

Optionally, modifying the received data based on the specified one or more effects to be injected into the received data comprises injecting a plurality of effects into the distributed computing system.

Optionally, the method further comprises ceasing modification of the received data based on the determination of the presence of one or more patterns within the received data based on the one or more watch points.

Optionally, determining the presence of one or more patterns within the received data based on the one or more watch points comprises determining a first pattern with the received data based on a first watch point and modifying the received data based on the specified one or more effects to be injected into the received data comprises injecting a first effect into the received data, and wherein the method comprises deactivating the first effect, determining a second pattern with the received data based on a second watch point, and modifying the received data based on a specified second effect to be injected into the received data.

According to an aspect, a system comprises: a memory, one or more processors, wherein the memory stores one or more programs that when executed by the one or more processors, cause the one or more processors to receive a specification of an effect to be injected into data transmitted between a plurality of components in a distributed computing system, the specification comprising one or more effects to be injected into the received data and one or more conditions during which the effect is to be injected into the received data, convert the one or more conditions into one or more watch points, wherein each watch point defines a pattern to be searched for in the data transmitted between the plurality of components, receive data transmitted between the plurality of components in a distributed computing system, determine the presence of one or more patterns within the received data based on the one or more watch points; and if the one or more patterns within the received data are determined to be present modify the received data based on the specified one or more effects to be injected into the received data; and transmit the modified received data to a component of the plurality of components in the distributed computing system.

Optionally, receiving the data comprises storing the data in a first temporary memory storage, and wherein modifying the received data based on the specified one or more effects to be injected comprises extracting the data stored in the first temporary memory storage, modifying the extracted data based on the specified one or more effects to be injected into the received data, and storing the modified extracted data in a second temporary memory storage.

Optionally, transmitting the modified received data to a component of the plurality of components in the distributed computing system comprises transmitting the modified extracted data from the second temporary memory storage to the component of the plurality of components in the distributed computing system.

Optionally, a storage size of the first temporary memory storage is based on an amount of time associated with determining the presence of one or more patterns within the received data based on the one or more watch points.

Optionally, the specification of an effect to be injected into the received data is generated by a user using a domain-specific programming language configured to allow the user to specify an effect to be injected into the distributed computing system and the one or more conditions during which the effect is to be injected into the received data.

Optionally, the domain-specific programming language comprises a modify syntax configured to allow the user to modify the received data.

Optionally, the domain-specific programming language comprises a delay syntax configured to delay the received data.

Optionally, converting the one or more conditions into one or more watch points comprises converting the one or more conditions into one or more regular expressions.

Optionally, determining the presence of one or more patterns within the received one or more data transmissions based on the one or more watch points comprises determining if the received one or more data transmissions partially matches a pattern identified by the one or more regular expressions.

Optionally, determining if the one or more data transmissions partially matches a pattern identified by the one or more regular expressions includes determining if the received one or more data transmissions continues a partially matched pattern found in a previously received data transmission.

Optionally, modifying the received data based on the specified one or more effects to be injected into the received data comprises invoking an Application Program Interface (API) of a component of the plurality of components in the distributed computing system.

Optionally, modifying the received data based on the specified one or more effects to be injected into the received data comprises injecting a plurality of effects into the distributed computing system.

Optionally, the processor is further caused to cease modification of the received data based on the determination of the presence of one or more patterns within the received data based on the one or more watch points.

Optionally, determining the presence of one or more patterns within the received data based on the one or more watch points comprises determining a first pattern with the received data based on a first watch point and modifying the received data based on the specified one or more effects to be injected into the received data comprises injecting a first effect into the received data, and wherein the processor is further caused to deactivate the first effect, determine a second pattern with the received data based on a second watch point, and modify the received data based on a specified second effect to be injected into the received data.

According to an aspect, a non-transitory computer readable storage medium storing one or more programs for execution by one or more processors of an electronic device that when executed by the device, causes the device to receive a specification of an effect to be injected into data transmitted between a plurality of components in a distributed computing system, the specification comprising one or more effects to be injected into the received data and one or more conditions during which the effect is to be injected into the received data, convert the one or more conditions into one or more watch points, wherein each watch point defines a pattern to be searched for in the data transmitted between the plurality of components, receive data transmitted between the plurality of components in a distributed computing system, determine the presence of one or more patterns within the received data based on the one or more watch points, and if the one or more patterns within the received data are determined to be present modify the received data based on the specified one or more effects to be injected into the received data, and transmit the modified received data to a component of the plurality of components in the distributed computing system.

Optionally, receiving the data comprises storing the data in a first temporary memory storage, and wherein modifying the received data based on the specified one or more effects to be injected comprises extracting the data stored in the first temporary memory storage, modifying the extracted data based on the specified one or more effects to be injected into the received data, and storing the modified extracted data in a second temporary memory storage.

Optionally, transmitting the modified received data to a component of the plurality of components in the distributed computing system comprises transmitting the modified extracted data from the second temporary memory storage to the component of the plurality of components in the distributed computing system.

Optionally, a storage size of the first temporary memory storage is based on an amount of time associated with determining the presence of one or more patterns within the received data based on the one or more watch points.

Optionally, the specification of an effect to be injected into the received data is generated by a user using a domain-specific programming language configured to allow the user to specify an effect to be injected into the distributed computing system and the one or more conditions during which the effect is to be injected into the received data.

Optionally, the domain-specific programming language comprises a modify syntax configured to allow the user to modify the received data.

Optionally, the domain-specific programming language comprises a delay syntax configured to delay the received data.

Optionally, converting the one or more conditions into one or more watch points comprises converting the one or more conditions into one or more regular expressions.

Optionally, determining the presence of one or more patterns within the received one or more data transmissions based on the one or more watch points comprises determining if the received one or more data transmissions partially matches a pattern identified by the one or more regular expressions.

Optionally, determining if the one or more data transmissions partially matches a pattern identified by the one or more regular expressions includes determining if the received one or more data transmissions continues a partially matched pattern found in a previously received data transmission.

Optionally, modifying the received data based on the specified one or more effects to be injected into the received data comprises invoking an Application Program Interface (API) of a component of the plurality of components in the distributed computing system.

Optionally, modifying the received data based on the specified one or more effects to be injected into the received data comprises injecting a plurality of effects into the distributed computing system.

Optionally, the device is further caused to cease modification of the received data based on the determination of the presence of one or more patterns within the received data based on the one or more watch points.

Optionally, determining the presence of one or more patterns within the received data based on the one or more watch points comprises determining a first pattern with the received data based on a first watch point and modifying the received data based on the specified one or more effects to be injected into the received data comprises injecting a first effect into the received data, and wherein the device is further caused to deactivate the first effect, determine a second pattern with the received data based on a second watch point, and modify the received data based on a specified second effect to be injected into the received data.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification, because this disclosure can be practiced throughout the disclosed numerical ranges.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A method, comprising:

receiving a specification of an effect to be injected into data transmitted between a plurality of components in a distributed computing system, the specification comprising one or more effects to be injected into the received data and one or more conditions during which the effect is to be injected into the received data;

converting the one or more conditions into one or more watch points, wherein each watch point defines a pattern to be searched for in the data transmitted between the plurality of components;

receiving data transmitted between the plurality of components in a distributed computing system, wherein receiving the data comprises storing the data in a first memory storage;

determining the presence of one or more patterns within the received data based on the one or more watch points; and if the one or more patterns within the received data are determined to be present:

modifying the received data based on the specified one or more effects to be injected into the received data, wherein modifying the received data based on the specified one or more effects to be injected comprises:

extracting the data stored in the first memory storage;

modifying the extracted data based on the specified one or more effects to be injected into the received data; and storing the modified extracted data in a second temporary memory storage; and transmitting the modified received data to a component of the plurality of components in the distributed computing system.

2. The method of claim 1, wherein transmitting the modified received data to a component of the plurality of components in the distributed computing system comprises transmitting the modified extracted data from the second memory storage to the component of the plurality of components in the distributed computing system.

3. The method of claim 1, wherein a storage size of the first memory storage is based on an amount of time associated with determining the presence of one or more patterns within the received data based on the one or more watch points.

4. The method of claim 1, wherein the specification of an effect to be injected into the received data is generated by a user using a domain-specific programming language configured to allow the user to specify an effect to be injected into the distributed computing system and the one or more conditions during which the effect is to be injected into the received data.

5. The method of claim 4, wherein the domain-specific programming language comprises a modify syntax configured to allow the user to modify the received data.

6. The method of claim 4, wherein the domain-specific programming language comprises a delay syntax configured to delay the received data.

7. The method of claim 1, wherein converting the one or more conditions into one or more watch points comprises converting the one or more conditions into one or more regular expressions.

8. The method of claim 7, wherein determining the presence of one or more patterns within the received one or more data transmissions based on the one or more watch points comprises determining if the received one or more data transmissions partially matches a pattern identified by the one or more regular expressions.

9. The method of claim 8, wherein determining if the one or more data transmissions partially matches a pattern identified by the one or more regular expressions includes determining if the received one or more data transmissions continues a partially matched pattern found in a previously received data transmission.

10. The method of claim 1, wherein modifying the received data based on the specified one or more effects to be injected into the received data comprises invoking an Application Program Interface (API) of a component of the plurality of components in the distributed computing system.

11. The method of claim 1, wherein modifying the received data based on the specified one or more effects to be injected into the received data comprises injecting a plurality of effects into the distributed computing system.

12. The method of claim 1, wherein the method further comprises ceasing modification of the received data based on the determination of the presence of one or more patterns within the received data based on the one or more watch points.

13. The method of claim 1, wherein determining the presence of one or more patterns within the received data based on the one or more watch points comprises determining a first pattern with the received data based on a first watch point and modifying the received data based on the specified one or more effects to be injected into the received data comprises injecting a first effect into the received data, and wherein the method comprises:
   deactivating the first effect;
   determining a second pattern with the received data based on a second watch point; and
   modifying the received data based on a specified second effect to be injected into the received data.

14. A system, comprising:
a memory;
one or more processors;
wherein the memory stores one or more programs that when executed by the one or more processors, cause the one or more processors to:
   receive a specification of an effect to be injected into data transmitted between a plurality of components in a distributed computing system, the specification comprising one or more effects to be injected into the received data and one or more conditions during which the effect is to be injected into the received data;
   convert the one or more conditions into one or more watch points, wherein each watch point defines a pattern to be searched for in the data transmitted between the plurality of components;
   receive data transmitted between the plurality of components in a distributed computing system, wherein receiving the data comprises storing the data in a first memory storage;
   determine the presence of one or more patterns within the received data based on the one or more watch points; and
   if the one or more patterns within the received data are determined to be present:
      modify the received data based on the specified one or more effects to be injected into the received data, wherein modifying the received data based on the specified one or more effects to be injected comprises:
         extracting the data stored in the first memory storage;
         modifying the extracted data based on the specified one or more effects to be injected into the received data; and
         storing the modified extracted data in a second temporary memory storage; and
      transmit the modified received data to a component of the plurality of components in the distributed computing system.

15. The system of claim 14, wherein transmitting the modified received data to a component of the plurality of components in the distributed computing system comprises transmitting the modified extracted data from the second memory storage to the component of the plurality of components in the distributed computing system.

16. The system of claim 14, wherein a storage size of the first memory storage is based on an amount of time associated with determining the presence of one or more patterns within the received data based on the one or more watch points.

17. The system of claim 14, wherein the specification of an effect to be injected into the received data is generated by a user using a domain-specific programming language configured to allow the user to specify an effect to be injected into the distributed computing system and the one or more conditions during which the effect is to be injected into the received data.

18. The system of claim 17, wherein the domain-specific programming language comprises a modify syntax configured to allow the user to modify the received data.

19. The system of claim 17, wherein the domain-specific programming language comprises a delay syntax configured to delay the received data.

20. The system of claim 14, wherein converting the one or more conditions into one or more watch points comprises converting the one or more conditions into one or more regular expressions.

21. The system of claim 20, wherein determining the presence of one or more patterns within the received one or more data transmissions based on the one or more watch points comprises determining if the received one or more data transmissions partially matches a pattern identified by the one or more regular expressions.

22. The system of claim 21, wherein determining if the one or more data transmissions partially matches a pattern identified by the one or more regular expressions includes determining if the received one or more data transmissions continues a partially matched pattern found in a previously received data transmission.

23. The system of claim 14, wherein modifying the received data based on the specified one or more effects to be injected into the received data comprises invoking an Application Program Interface (API) of a component of the plurality of components in the distributed computing system.

24. The system of claim 14, wherein modifying the received data based on the specified one or more effects to be injected into the received data comprises injecting a plurality of effects into the distributed computing system.

25. The system of claim 14, wherein the processor is further caused to cease modification of the received data based on the determination of the presence of one or more patterns within the received data based on the one or more watch points.

26. The system of claim 14, wherein determining the presence of one or more patterns within the received data based on the one or more watch points comprises determining a first pattern with the received data based on a first watch point and modifying the received data based on the specified one or more effects to be injected into the received data comprises injecting a first effect into the received data, and wherein the processor is further caused to:
deactivate the first effect;
determine a second pattern with the received data based on a second watch point;
and
modify the received data based on a specified second effect to be injected into the received data.

27. A non-transitory computer readable storage medium storing one or more programs for execution by one or more processors of an electronic device that when executed by the device, causes the device to:
receive a specification of an effect to be injected into data transmitted between a plurality of components in a distributed computing system, the specification comprising one or more effects to be injected into the received data and one or more conditions during which the effect is to be injected into the received data;
convert the one or more conditions into one or more watch points, wherein each watch point defines a pattern to be searched for in the data transmitted between the plurality of components;
receive data transmitted between the plurality of components in a distributed computing system, wherein receiving the data comprises storing the data in a first memory storage;
determine the presence of one or more patterns within the received data based on the one or more watch points; and if the one or more patterns within the received data are determined to be present:
modify the received data based on the specified one or more effects to be injected into the received data, wherein modifying the received data based on the specified one or more effects to be injected comprises:
extracting the data stored in the first memory storage;
modifying the extracted data based on the specified one or more effects to be injected into the received data; and
storing the modified extracted data in a second temporary memory storage; and
transmit the modified received data to a component of the plurality of components in the distributed computing system.

28. The non-transitory computer readable storage medium of claim 27, wherein transmitting the modified received data to a component of the plurality of components in the distributed computing system comprises transmitting the modified extracted data from the second memory storage to the component of the plurality of components in the distributed computing system.

29. The non-transitory computer readable storage medium of claim 27, wherein a storage size of the first memory storage is based on an amount of time associated with determining the presence of one or more patterns within the received data based on the one or more watch points.

30. The non-transitory computer readable storage medium of claim 27, wherein the specification of an effect to be injected into the received data is generated by a user using a domain-specific programming language configured to allow the user to specify an effect to be injected into the distributed computing system and the one or more conditions during which the effect is to be injected into the received data.

31. The non-transitory computer readable storage medium of claim 30, wherein the domain-specific programming language comprises a modify syntax configured to allow the user to modify the received data.

32. The non-transitory computer readable storage medium of claim 30, wherein the domain-specific programming language comprises a delay syntax configured to delay the received data.

33. The non-transitory computer readable storage medium of claim 27, wherein converting the one or more conditions into one or more watch points comprises converting the one or more conditions into one or more regular expressions.

34. The non-transitory computer readable storage medium of claim 33, wherein determining the presence of one or more patterns within the received one or more data transmissions based on the one or more watch points comprises determining if the received one or more data transmissions partially matches a pattern identified by the one or more regular expressions.

35. The non-transitory computer readable storage medium of claim 34, wherein determining if the one or more data transmissions partially matches a pattern identified by the one or more regular expressions includes determining if the received one or more data transmissions continues a partially matched pattern found in a previously received data transmission.

36. The non-transitory computer readable storage medium of claim 27, wherein modifying the received data based on the specified one or more effects to be injected into the received data comprises invoking an Application Program Interface (API) of a component of the plurality of components in the distributed computing system.

37. The non-transitory computer readable storage medium of claim 27, wherein modifying the received data based on the specified one or more effects to be injected into the received data comprises injecting a plurality of effects into the distributed computing system.

38. The non-transitory computer readable storage medium of claim 27, wherein the device is further caused to cease modification of the received data based on the determination of the presence of one or more patterns within the received data based on the one or more watch points.

39. The non-transitory computer readable storage medium of claim 27, wherein determining the presence of one or more patterns within the received data based on the one or more watch points comprises determining a first pattern with the received data based on a first watch point and modifying the received data based on the specified one or more effects to be injected into the received data comprises injecting a first effect into the received data, and wherein the device is further caused to:
   deactivate the first effect;
   determine a second pattern with the received data based on a second watch point;
   and
   modify the received data based on a specified second effect to be injected into the received data.

* * * * *